(12) United States Patent
Ogata et al.

(10) Patent No.: US 10,868,973 B2
(45) Date of Patent: Dec. 15, 2020

(54) SURVEILLANCE CAMERA

(71) Applicant: PANASONIC I-PRO SENSING SOLUTIONS CO., LTD., Fukuoka (JP)

(72) Inventors: Tsuyoshi Ogata, Fukuoka (JP); Daisuke Hara, Fukuoka (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 10 days.

(21) Appl. No.: 16/509,004

(22) Filed: Jul. 11, 2019

(65) Prior Publication Data
US 2019/0387180 A1 Dec. 19, 2019

Related U.S. Application Data

(63) Continuation of application No. 16/176,306, filed on Oct. 31, 2018, now Pat. No. 10,574,902.

(30) Foreign Application Priority Data

Jun. 19, 2018 (JP) .................. 2018-116387

(51) Int. Cl.
| | |
|---|---|
| H04N 5/247 | (2006.01) |
| H04N 5/225 | (2006.01) |
| H04N 5/44 | (2011.01) |
| H04N 5/445 | (2011.01) |
| H04N 21/47 | (2011.01) |
| H04N 21/431 | (2011.01) |
| H04N 21/422 | (2011.01) |

(52) U.S. Cl.
CPC ........... *H04N 5/247* (2013.01); *H04N 5/2251* (2013.01); *H04N 21/42204* (2013.01); *H04N 21/4316* (2013.01); *H04N 21/47* (2013.01)

(58) Field of Classification Search
CPC ................ H04N 5/247; H04N 5/2251; H04N 21/42204; H04N 21/4316; H04N 21/47
USPC ......................................... 348/159
See application file for complete search history.

(56) References Cited

U.S. PATENT DOCUMENTS

| | | |
|---|---|---|
| 7,023,913 B1 | 4/2006 | Monroe |
| 2008/0231950 A1 | 9/2008 | Lvovsky et al. |

(Continued)

FOREIGN PATENT DOCUMENTS

| | | |
|---|---|---|
| JP | 2005-286498 | 10/2005 |
| JP | 2012-520650 | 9/2012 |

(Continued)

OTHER PUBLICATIONS

The extended European Search Report dated Nov. 19, 2019 issued in European Patent Appl. No. 19180609.0-1206.

*Primary Examiner* — Matthew K Kwan
(74) *Attorney, Agent, or Firm* — Greenblum & Bernstein, P.L.C.

(57) ABSTRACT

A dome type surveillance camera includes a plurality of cameras, and a controller which causes to display, on a display, video data of images captured by the plurality of cameras. One camera of the plurality of cameras is movable so that an imaging direction of the one camera turns toward a top of a cover which covers the plurality of cameras. The controller places, horizontally in a line, the images from some of the plurality of cameras, which do not turn toward the top, on the display, and places, substantially in a middle of and beneath or above the line, the image from the one camera which is movable so as to turn toward the top.

6 Claims, 21 Drawing Sheets

(56) References Cited

U.S. PATENT DOCUMENTS

| | | |
|---|---|---|
| 2011/0267462 A1 | 11/2011 | Cheng et al. |
| 2011/0310219 A1 | 12/2011 | Kim et al. |
| 2014/0160274 A1 | 6/2014 | Ishida et al. |
| 2014/0187173 A1 | 7/2014 | Partee |
| 2016/0112608 A1 | 4/2016 | Elensi et al. |
| 2017/0201672 A1 | 7/2017 | Hayashi et al. |

FOREIGN PATENT DOCUMENTS

| | | |
|---|---|---|
| JP | 2013-062559 | 4/2013 |
| JP | 2014-115374 | 6/2014 |
| JP | 2016-082585 | 5/2016 |
| WO | 2013-186805 | 12/2013 |
| WO | 2016-038976 | 3/2016 |

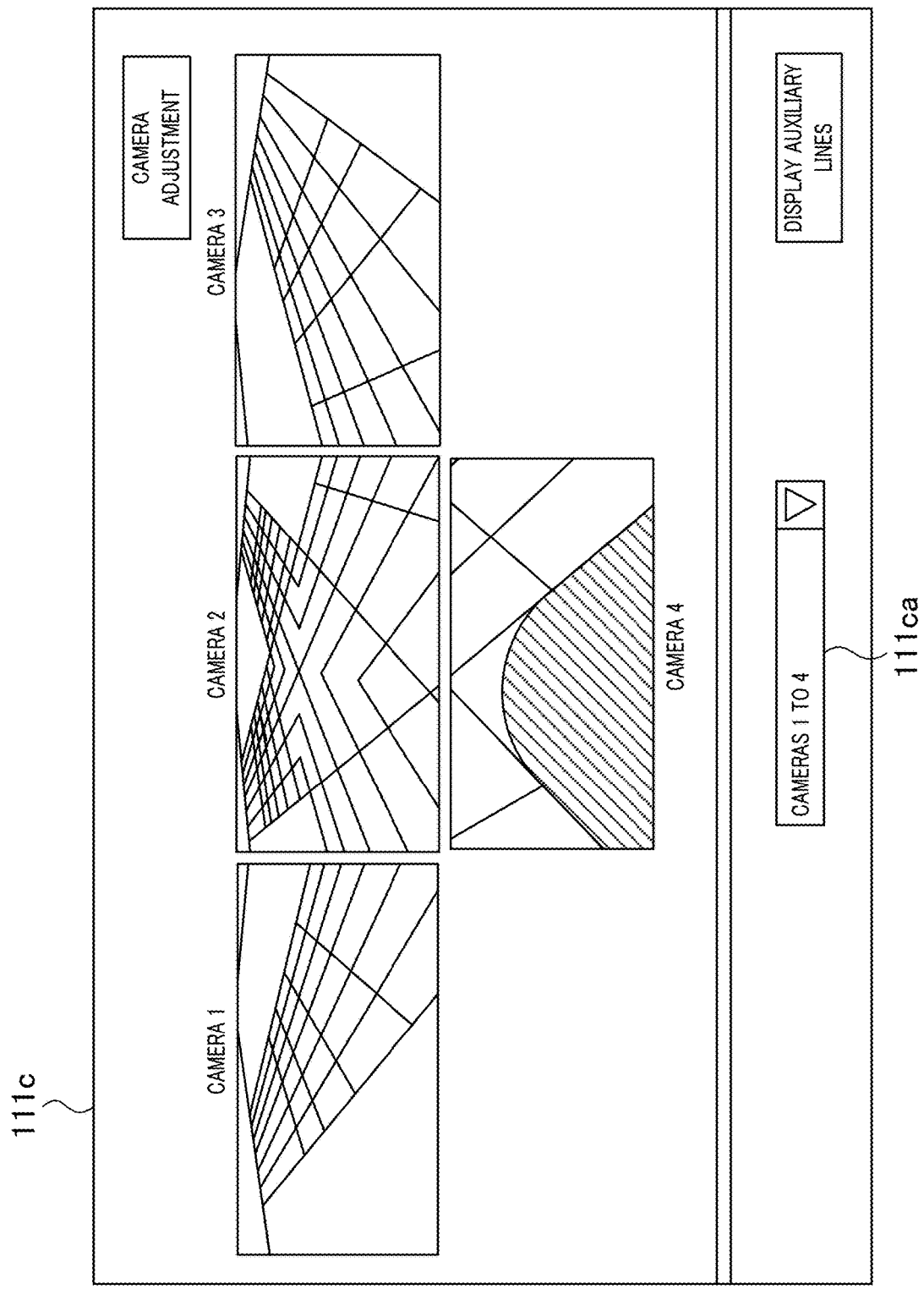

SURVEILLANCE CAMERA

CROSS REFERENCE TO RELATED APPLICATIONS

This application is a Continuation of U.S. patent application Ser. No. 16/176,306, filed on Oct. 31, 2018, which claims priority to Japanese Patent Application No. 2018-116387, filed on Jun. 19, 2018, the entire disclosures of which Applications are incorporated by reference herein.

TECHNICAL FIELD

The present disclosure relates to a dome type surveillance camera.

DESCRIPTION OF THE RELATED ART

In the related art, there is an omnidirectional camera that includes a plurality of cameras and can image areas in all directions. For example, in Patent Literature 1 (herein also referred to as "PTL 1"), an omnidirectional camera that can acquire a seamless and omnidirectional image and improves the accuracy of measuring location information based on a GPS signal is disclosed.

CITATION LIST

Patent Literature

PTL 1 Japanese Patent Unexamined Publication No. 2014-115374

SUMMARY OF INVENTION

Technical Problem

When a surveillance camera is provided on the outer wall of a building or the like, the direction or the like of the camera is adjusted by an installer. For example, the installer adjusts the direction or the like of the camera so that the camera faces a monitoring place to be imaged.

However, in the related art, as adjustment of the surveillance camera while watching images captured by the camera is impossible, it is difficult for the installer to adjust the camera.

One non-limiting and exemplary embodiment facilitates providing a surveillance camera capable of easy adjustment of cameras therein.

Solution to Problem

According to an aspect of the disclosure, there is provided a surveillance camera that is a dome type surveillance camera. The surveillance camera includes a plurality of cameras, a connector to which a wireless adapter is detachably attached, and a controller which wirelessly transmits video data of an image captured by the plurality of cameras to a mobile terminal via the wireless adapter attached to the connector.

It should be noted that general or specific embodiments may be implemented as a system, a method, an integrated circuit, a computer program, a storage medium, or any selective combination thereof.

Summary of Invention

According to the aspect of the disclosure, cameras in the surveillance camera can be easily adjusted.

An advantage and an effect of the aspect of the disclosure are apparent from the specification and the drawings. Although each of such an advantage and/or effect is provided in several embodiments and characteristics described in the specification and the drawings, not all of the advantage and/or effect are required to be provided in order to obtain one or more of the same characteristics.

BRIEF DESCRIPTION OF DRAWINGS

FIG. 25C is a view illustrating an example of the mobile terminal screen;

DESCRIPTION OF EMBODIMENTS

Hereinafter, an embodiment of the disclosure will be described in detail with reference to appropriate drawings. However, needlessly detailed description will be omitted in some cases. For example, detailed description of matters which are already well known or repeated description of practically the same configurations will be omitted in some cases. That is to avoid the following description being needlessly long, and to promote understanding for those skilled in the art.

The accompanying drawings and the following description are provided to help those skilled in the art sufficiently understand the disclosure. The drawings and the description are not intended to limit the scope of the claims.

Figure 1:
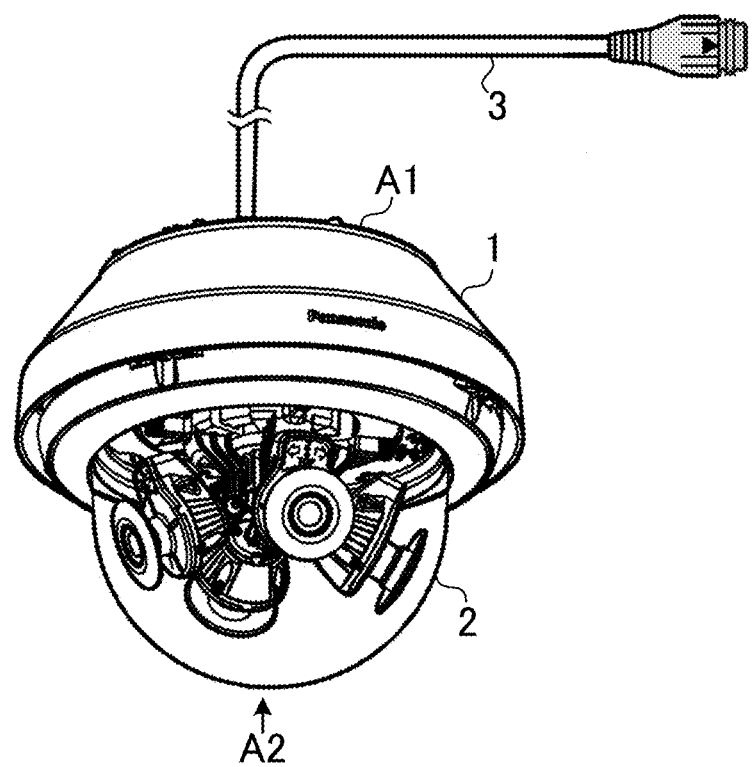
FIG. 1 is a side view of a surveillance camera according to an embodiment of the disclosure.

FIG. 1 is a side view of a surveillance camera according to the embodiment of the disclosure. The surveillance camera illustrated in FIG. 1 is provided, for example, on a traffic light pole and a utility pole, which are provided at an intersection, or inside or outside a structure such as a building. The surveillance camera is connected to, for example, an information processing device such as a server or a personal computer, and transmits a captured image to the information processing device.

As illustrated in FIG. 1, the surveillance camera has housing 1, cover 2 and cable 3. Housing 1 has fixing surface A1 on a bottom. The surveillance camera is fixed to, for example, a traffic light pole, a utility pole, or a structure, such as a building, via fixing surface A1.

Cover 2 is a dome type cover, and has a hemispheric shape. Cover 2 is formed of, for example, a transparent material such as glass or plastic. A portion indicated by arrow A2 of FIG. 1 is a top of cover 2.

Cover 2 is fixed to housing 1 so as to cover a plurality of cameras (for example, refer to FIG. 2 or 3) mounted on housing 1. Cover 2 protects the plurality of cameras mounted on housing 1.

Cable 3 is, for example, a network cable. The surveillance camera is connected to, for example, a network such as a LAN or the Internet, via cable 3.

Video data of an image captured by the surveillance camera is transmitted to the information processing device via cable 3 and the network. The information processing device displays the image of the video data received from the surveillance camera on, for example, a display provided in a monitor room located in a place other than where the surveillance camera is provided.

Figure 2:
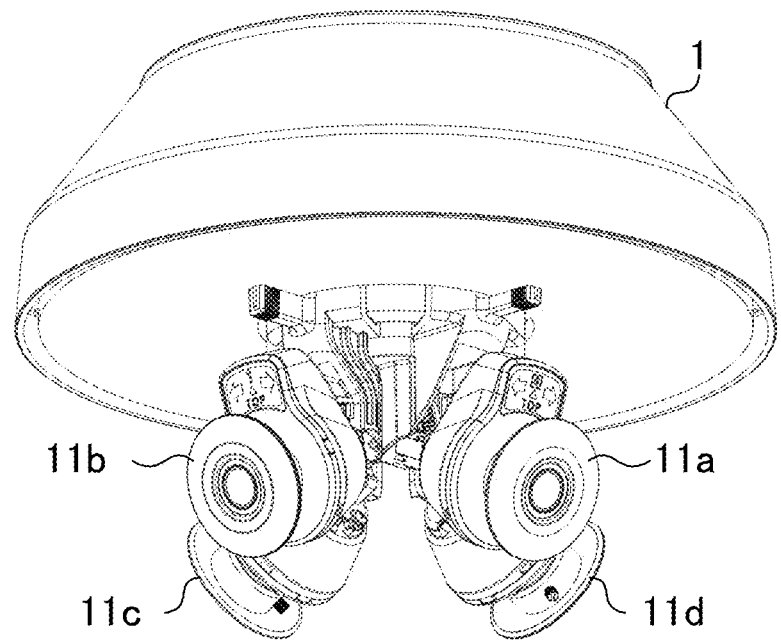
FIG. 2 is a side view of the surveillance camera in a state where a cover is removed.

FIG. 2 is a side view of the surveillance camera in a state where cover 2 is removed. In FIG. 2, the same elements as FIG. 1 are assigned with the same reference signs. As illustrated in FIG. 2, the surveillance camera has a plurality of cameras 11a, 11b, 11c, and 11d.

Figure 3:
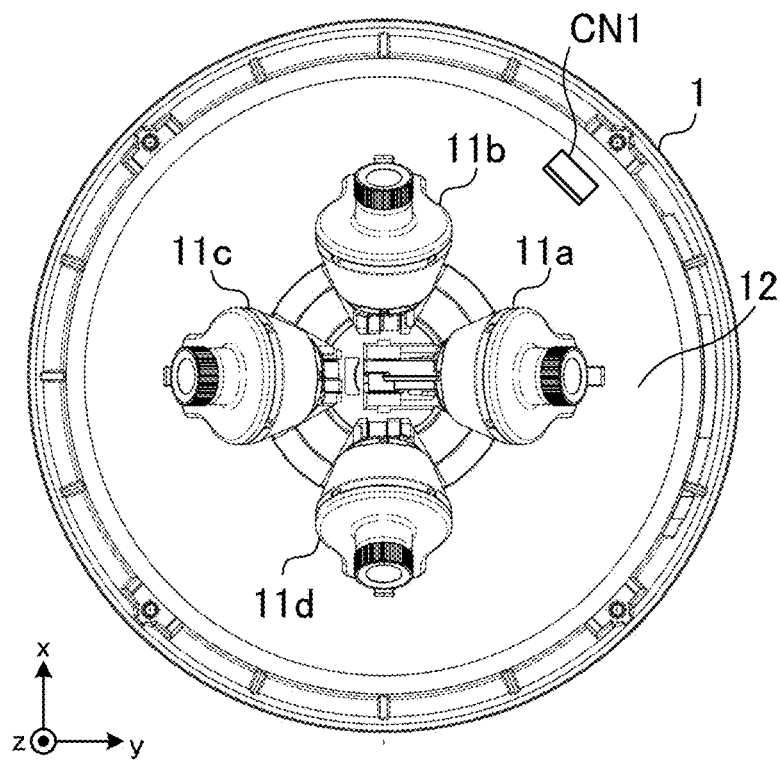
FIG. 3 is a front view of the surveillance camera in the state where the cover is removed.

FIG. 3 is a front view of the surveillance camera in a state where cover 2 is removed. In FIG. 3, the same elements as FIG. 2 are assigned with the same reference signs. As illustrated in FIG. 3, the surveillance camera has four cameras 11a to 11d. Imaging directions of cameras 11a to 11d (for example, directions perpendicularly extending from lens surfaces) are adjusted (moved) by a user's hand. Hereinafter, three coordinate axes illustrated in FIG. 3 are set with respect to the surveillance camera.

Housing 1 has base 12. Base 12 is a plate-shaped member, and has a circular shape when seen from the front of the device (+z axis direction). As will be described later in detail, cameras 11a to 11d are movably fixed (connected) to base 12.

The center of base 12 is located immediately below the top of cover 2 (right below the top). For example, the center of base 12 is located right below the top of cover 2, which is indicated with arrow A2 of FIG. 1.

Base 12 has connector CN1. Connector CN1 is, for example, an USB connector. As will be described later, a wireless adapter is attached to or detached from connector CN1.

Figure 4:
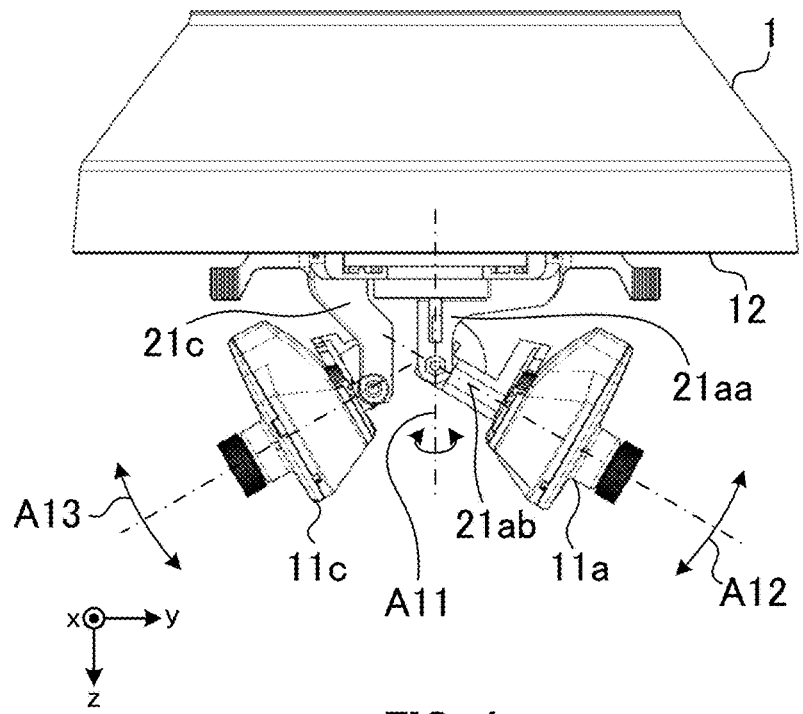
FIG. 4 is a side view of the surveillance camera in the state where the cover is removed.

FIG. 4 is a side view of the surveillance camera in a state where cover 2 is removed. In FIG. 4, the same elements as FIGS. 2 and 3 are assigned with the same reference signs. In FIG. 4, cameras 11a and 11c are illustrated and the illustration of cameras 11b and 11d is omitted in order to simplify description. As illustrated in FIG. 4, the surveillance camera has connecting members 21aa, 21ab, and 21c.

Connecting member 21aa extends from the center of base 12 toward the top of cover 2. In other words, connecting member 21aa extends from base 12 located immediately below the top of cover 2 toward the top of cover 2.

Connecting member 21aa has an axis extending from the center of base 12 toward the top of cover 2, and rotates about the axis. For example, axis A11 illustrated in FIG. 4 is an axis of connecting member 21aa extending from the center of base 12 toward the top of cover 2. Connecting member 21aa rotates in a right-and-left direction about axis A11 of FIG. 4, which is a rotation axis.

One end of connecting member 21ab is connected to an end portion of connecting member 21aa on a side opposite to base 12. In addition, the other end of connecting member 21ab is connected to camera 11a.

The one end of connecting member 21ab is connected to connecting member 21aa such that the other end moves in an elevation angle direction with respect to base 12. That is, the other end of connecting member 21ab moves in the elevation angle direction with respect to base 12. Hereinafter, the elevation angle direction with respect to base 12 will be simply called an elevation angle direction in some cases.

As described above, the other end of connecting member 21ab is connected to camera 11a. The other end of connecting member 21ab moves in the elevation angle direction. Therefore, the imaging direction of camera 11a moves in the elevation angle direction. For example, arrow A12 illustrated in FIG. 4 indicates the elevation angle direction with respect to base 12. The imaging direction of camera 11a moves in an arrow A12 direction of FIG. 4.

Connecting member 21c extends from a position separated away from the center of base 12 toward the top of cover 2. For example, connecting member 21c extends toward the top of cover 2 from a position separated away from the point where axis A11 of connecting member 21aa and base 12 intersect (the center of base 12). As will be described later, connecting member 21c is connected to base 12 so as to be movable on a circumference of which the center corresponds to the center of base 12 (for example, refer to rail 41 of FIG. 10 or 12).

Camera 11c is connected to an end portion of connecting member 21c on a side opposite to base 12. Camera 11c is connected to connecting member 21c such that the imaging direction thereof moves in an elevation angle direction. For example, arrow A13 illustrated in FIG. 4 indicates the elevation angle direction with respect to base 12. The imaging direction of camera 11c moves in an arrow A13 direction of FIG. 4.

Figure 5:
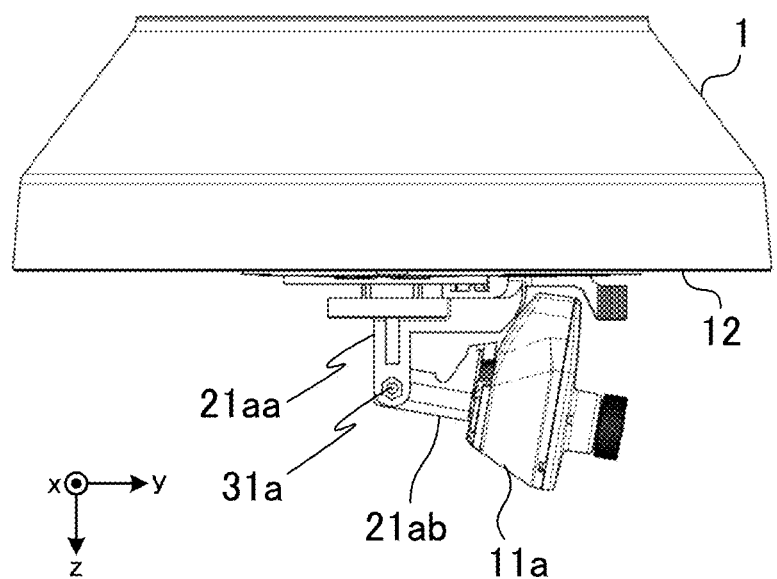
FIG. 5 is a side view of the surveillance camera in the state where the cover is removed.

FIG. 5 is a side view of the surveillance camera in a state where cover 2 is removed. In FIG. 5, the same elements as FIG. 4 are assigned with the same reference signs. In FIG. 5, camera 11a is illustrated in order to simplify description, and the illustration of camera 11c, which is illustrated in FIG. 4, is omitted. As illustrated in FIG. 5, the surveillance camera has shaft member 31a.

Shaft member 31a connects connecting member 21aa to connecting member 21ab. Shaft member 31a connects connecting member 21ab to connecting member 21aa such that the other end of connecting member 21ab (side on which camera 11a is mounted) moves in the elevation angle direction.

Figure 6:
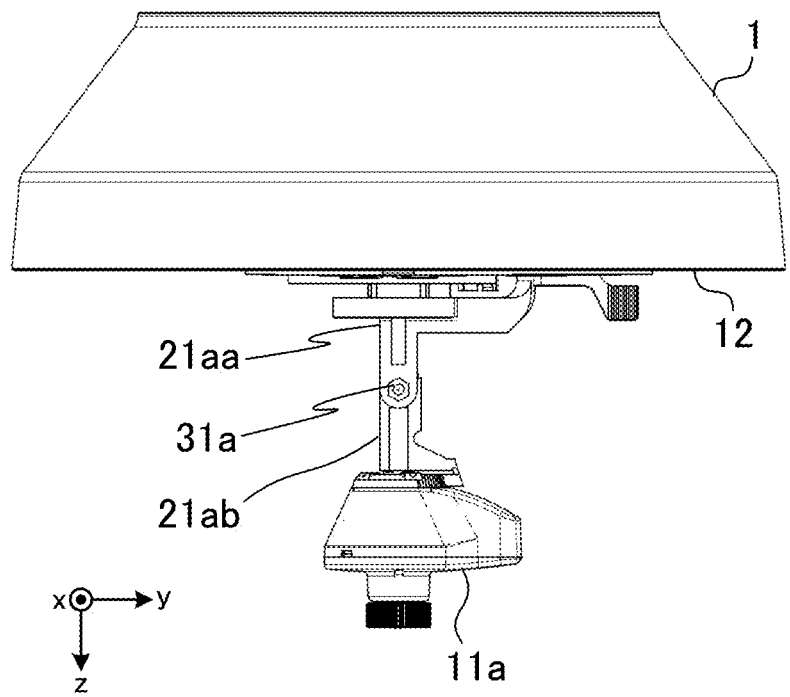
FIG. 6 is a view illustrating a state where an imaging direction of a camera is aligned with a top direction of the cover.

FIG. 6 is a view illustrating a state where the imaging direction of camera 11a is aligned with a top direction of cover 2. In FIG. 6, the same elements as FIG. 5 are assigned with the same reference signs.

Connecting member 21ab rotates with respect to connecting member 21aa about the center axis of shaft member 31a, which is a rotation axis. Accordingly, the imaging direction of camera 11a can be aligned with the top direction of cover 2 (+z axis direction) as illustrated in FIG. 6.

Connecting member 21ab may rotate with respect to connecting member 21aa such that the other end traverses the top direction. That is, the imaging direction of camera 11a may move out of the top direction of cover 2.

Figure 7:
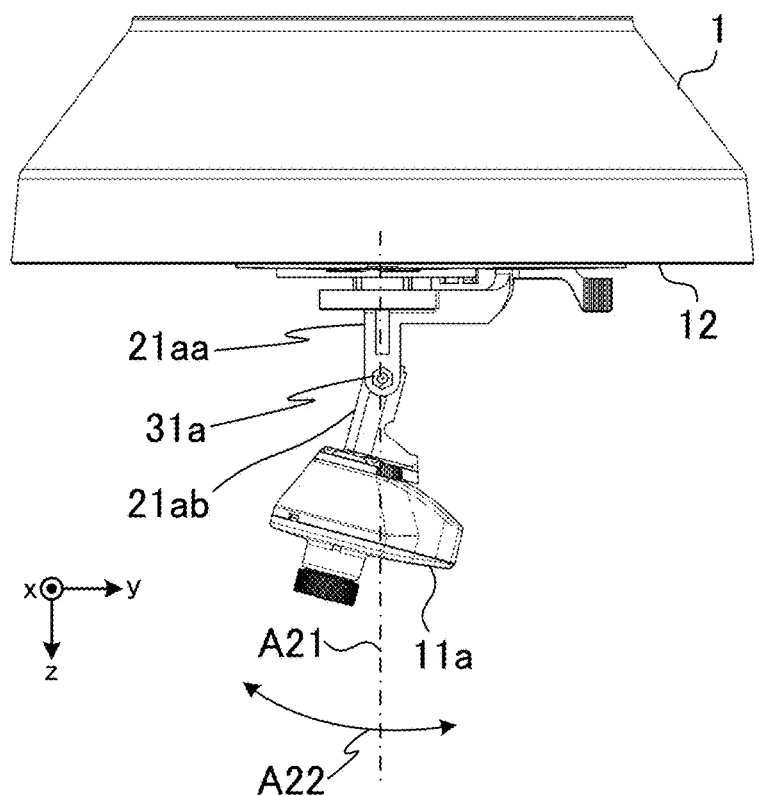
FIG. 7 is a view illustrating a state where the imaging direction of the camera has moved out of the top direction of the cover.

FIG. 7 is a view illustrating a state where the imaging direction of camera 11a has moved out of the top direction of cover 2. In FIG. 7, the same elements as FIGS. 5 and 6 are assigned with the same reference signs.

The imaging direction of camera 11a illustrated in FIG. 7 has moved so as to traverse the top direction of cover 2 in contrast to camera 11a illustrated in FIG. 6. For example, one-dot chain line A21 illustrated in FIG. 7 indicates the top direction of cover 2. The imaging direction of camera 11a moves so as to traverse the one-dot chain line A21 as indicated with arrow A22 of FIG. 7. A range in which the imaging direction of camera 11a is movable in the elevation angle direction is, for example, 10 degrees to 110 degrees with respect to base 12.

The imaging directions of cameras 11b to 11d (for example, refer to FIG. 3) other than camera 11a do not move so as to traverse the top direction of cover 2. That is, out of four cameras 11a to 11d, one camera 11a moves so as to traverse the top direction of cover 2. A range in which each of the imaging directions of cameras 11b to 11d is movable in the elevation angle direction is, for example, 10 degrees to 80 degrees with respect to base 12.

Shaft member 31a may be provided so as to be located at a center point of cover 2 having a hemispheric shape. In this case, camera 11a (lens of camera 11a) moves such that a trajectory thereof in the elevation angle direction with respect to base 12 follows a curved surface of cover 2. Accordingly, camera 11a moves in the elevation angle direction while keeping a fixed distance to cover 2, and can prevent a change in the index of refraction of cover 2 caused by a change in the distance to cover 2.

As illustrated in FIG. 4, connecting member 21aa rotates in the right-and-left direction about axis A11 illustrated in FIG. 4, which is a rotation axis. That is, the imaging direction of camera 11a rotates in an azimuth direction of base 12 about an axis extending from base 12 in the top direction of cover 2, which is a rotation axis.

Figure 8:
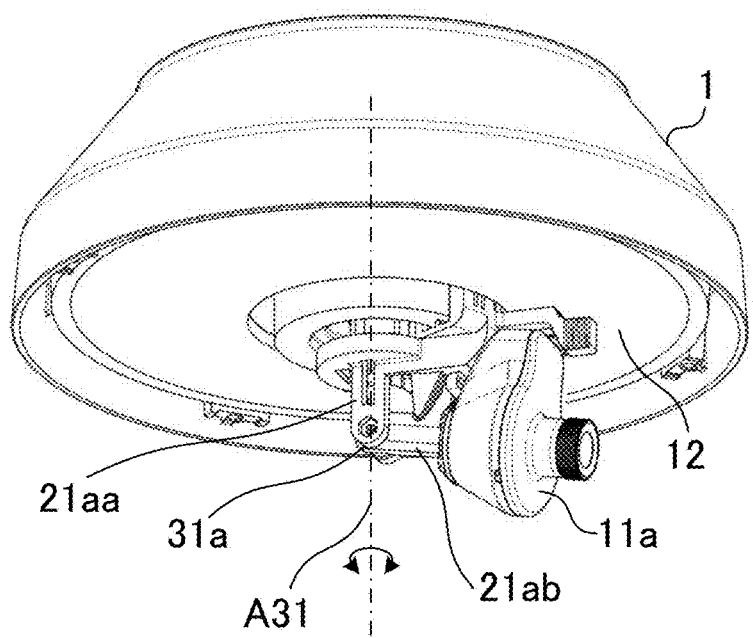
FIG. 8 is a view illustrating rotation of the camera with the top direction of the cover as a rotation axis.

FIG. 8 is a view illustrating rotation of camera 11a with the top direction of cover 2 as a rotation axis. FIG. 8 is a perspective view of the surveillance camera seen from a cover 2 side. In FIG. 8, the same elements as FIG. 7 are assigned with the same reference signs.

As illustrated in FIG. 8, connecting member 21aa extends from the center of circular base 12 toward the top direction of cover 2, and rotates in the right-and-left direction about axis A31 of FIG. 8, which is a rotation axis. Accordingly, the imaging direction of camera 11a connected to connecting members 21aa and 21ab rotates in the right-and-left direction about axis A31, which is a rotation axis.

Figure 9:
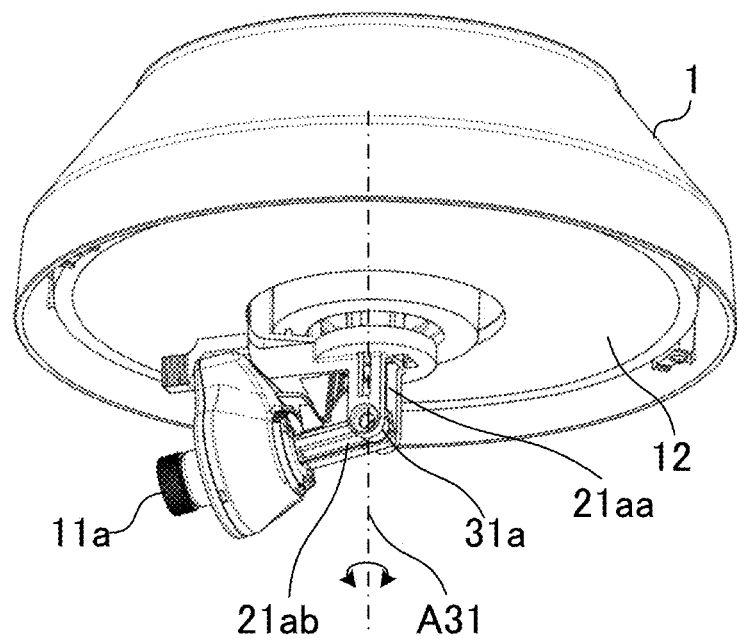
FIG. 9 is a view illustrating a state where the camera has rotated with the top direction of the cover as a rotation axis.

FIG. 9 is a view illustrating a state where camera 11a has rotated with the top direction of cover 2 as a rotation axis. In FIG. 9, the same elements as FIG. 8 are assigned with the same reference signs.

The imaging direction of camera 11a illustrated in FIG. 9 has changed from the imaging direction of camera 11a illustrated in FIG. 8. As illustrated in FIGS. 8 and 9, camera 11a rotates about connecting member 21aa extending from the center of circular base 12 toward the top direction of cover 2, which is a rotation axis.

Figure 10:
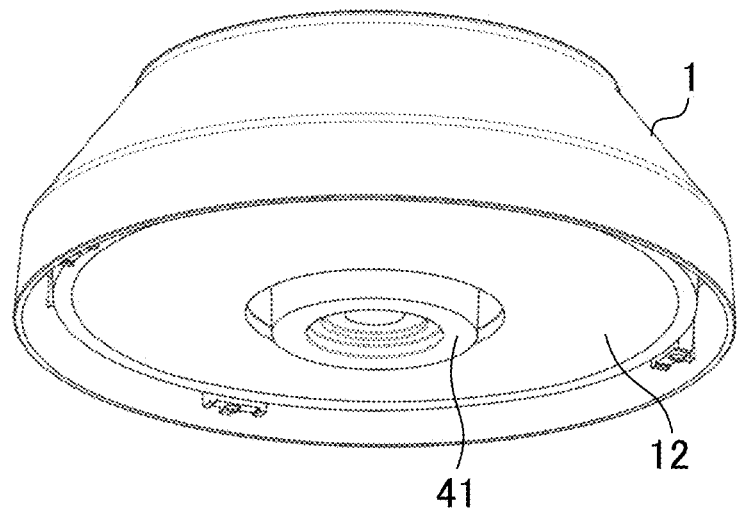
FIG. 10 is a view illustrating a housing and a base of the surveillance camera.

FIG. 10 is a view illustrating housing 1 and base 12 of the surveillance camera. In FIG. 10, the same elements as FIG. 9 are assigned with the same reference signs. As illustrated in FIG. 10, base 12 has circular rail 41 having a fixed width. The center of circular rail 41 matches the center of base 12.

Figure 11:
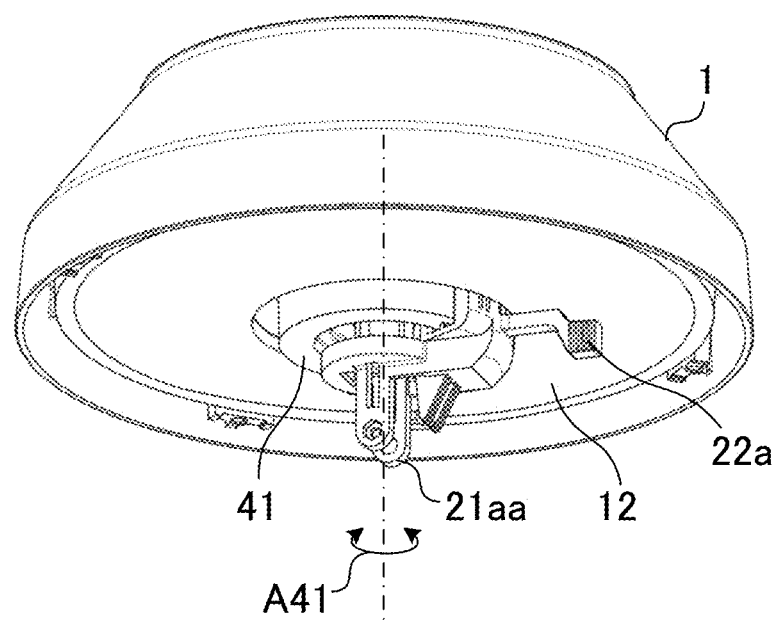
FIG. 11 is a view of a connecting member mounted on the base illustrated in FIG. 10.

FIG. 11 is a view of connecting member 21aa mounted on base 12 illustrated in FIG. 10. In FIG. 11, the same elements as FIG. 10 are assigned with the same reference signs.

As illustrated in FIG. 11, connecting member 21aa has gripper 22a. Gripper 22a extends from connecting member 21aa in the azimuth direction so as to be parallel to a surface of base 12.

Connecting member 21aa rotates in the azimuth direction of base 12 in response to an operation of gripper 22a by a user. For example, connecting member 21aa rotates in a direction of arrow A41 of FIG. 11. Accordingly, the imaging direction of camera 11a connected to connecting member 21aa rotates in the azimuth direction via connecting member 21ab (refer to camera 11a of FIGS. 8 and 9). Hereinafter, the azimuth direction of base 12 will be simply called an azimuth direction in some cases.

As illustrated in FIG. 11, connecting member 21aa that connects camera 11a having an imaging direction aligned with the top direction of cover 2 is connected to base 12 at the center of base 12. On the contrary, connecting members that connect cameras 11b to 11d having imaging directions not aligned with the top direction of cover 2 are connected to base 12 (rail 41) off the center of base 12.

Figure 12:
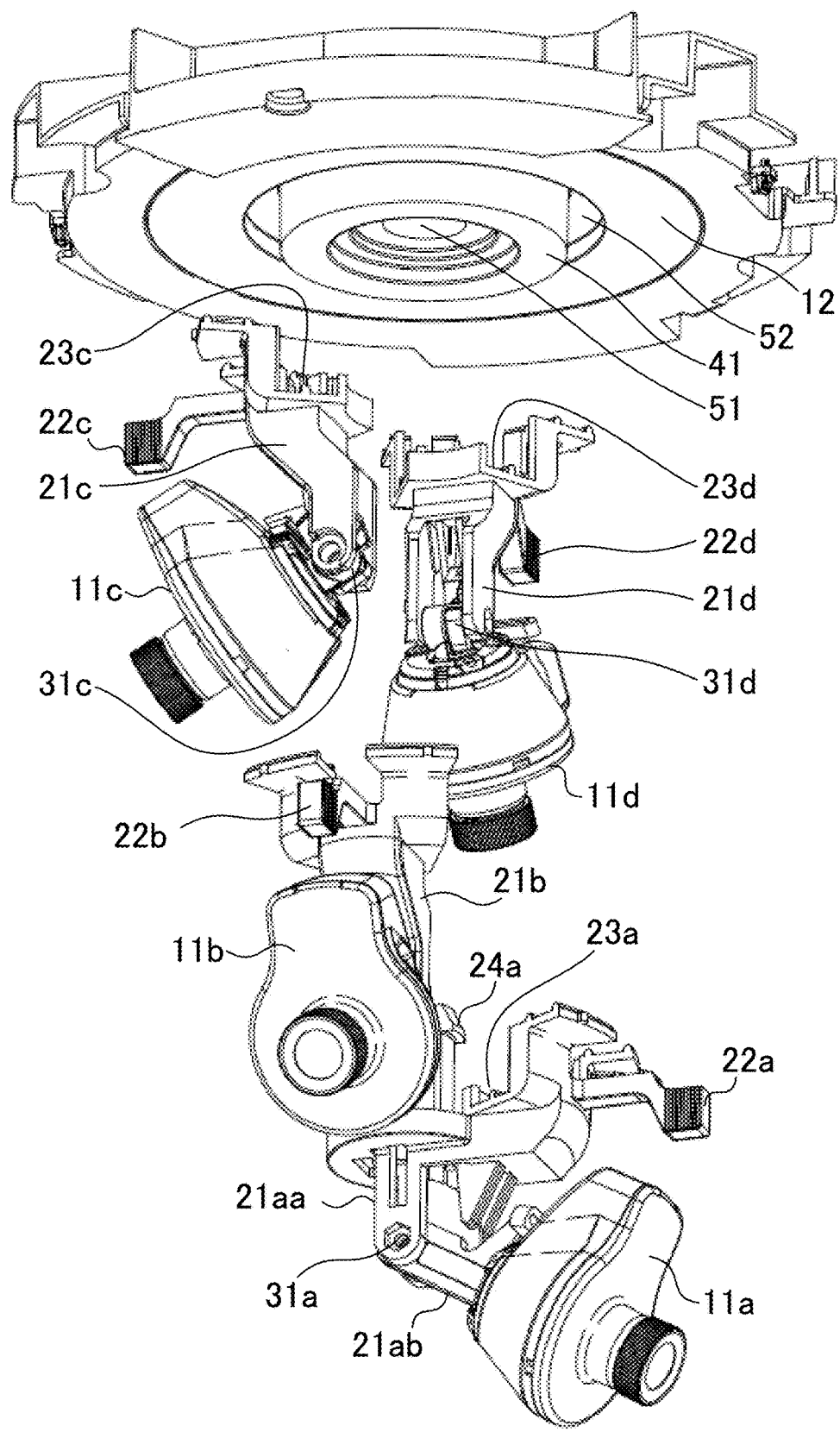
FIG. 12 is a view illustrating connection of the connecting member to the base.

FIG. 12 is a view illustrating connection of connecting members 21aa and 21b to 21d to base 12. In FIG. 12, the same elements as FIG. 11 are assigned with the same reference signs. FIG. 12 is a perspective view of the surveillance camera seen from the cover 2 side.

At the center of rail 41, hole 51 is formed. In addition, concentric hole 52 is formed on the outside of rail 41.

Camera 11a is connected to connecting member 21ab. Connecting member 21ab is connected to connecting member 21aa via shaft member 31a. Connecting member 21aa has gripper 22a, fitting portion 23a, and protrusion 24a (a part thereof is hidden behind camera 11b) extending in an upward direction in FIG. 12.

Protrusion 24a passes through hole 51 formed in the center of base 12. Fitting portion 23a has a dent shape such that rail 41 is sandwiched therein. Fitting portion 23a is slidably fitted to rail 41 of base 12. That is, fitting portion 23a slides along rail 41. Accordingly, connecting member 21ab can rotate in the azimuth direction in response to an operation of gripper 22a by a user.

Camera 11b is connected to connecting member 21b via a shaft member (not illustrated). Camera 11b rotates about the center axis of the shaft member, which is a rotation axis, such that the imaging direction thereof moves in the elevation angle direction.

Connecting member 21b has gripper 22b and fitting portion 23b (not illustrated). Connecting member 21b slides along rail 41 in response to an operation of gripper 22b by a user. That is, the imaging direction of camera 11b can rotate in the azimuth direction in response to the operation by the user.

Camera 11c is connected to connecting member 21c via shaft member 31c. Camera 11c rotates about shaft member 31c, which is a rotation axis, such that the imaging direction thereof moves in the elevation angle direction.

Connecting member 21c has gripper 22c and fitting portion 23c. Fitting portion 23c has a dent shape such that rail 41 is sandwiched therein. Fitting portion 23c is slidably fitted to rail 41 of base 12. That is, fitting portion 23c slides along rail 41. Accordingly, connecting member 21c slides along rail 41 in response to an operation of gripper 22c by a user, and the imaging direction of camera 11c can rotate in the azimuth direction.

Camera 11d is connected to connecting member 21d via shaft member 31d. Camera 11d rotates about shaft member 31d, which is a rotation axis, such that the imaging direction thereof moves in the elevation angle direction.

Connecting member 21d has gripper 22d and fitting portion 23d. Fitting portion 23d has a dent shape such that rail 41 is sandwiched therein. Fitting portion 23d is slidably fitted to rail 41 of base 12. That is, fitting portion 23d slides along rail 41. Accordingly, connecting member 21d slides along rail 41 in response to an operation of gripper 22d by a user, and the imaging direction of camera 11d can rotate in the azimuth direction.

Connecting members 21b to 21d of cameras 11b to 11d each have the same shape or structure. Connecting members 21b to 21d of cameras 11b to 11d are connected to base 12 off the center of base 12. On the other hand, connecting member 21aa of camera 11a is connected to base 12 at the center of base 12. Accordingly, camera 11a, out of the plurality of cameras 11a to 11d, can face the top of cover 2.

Figure 13:
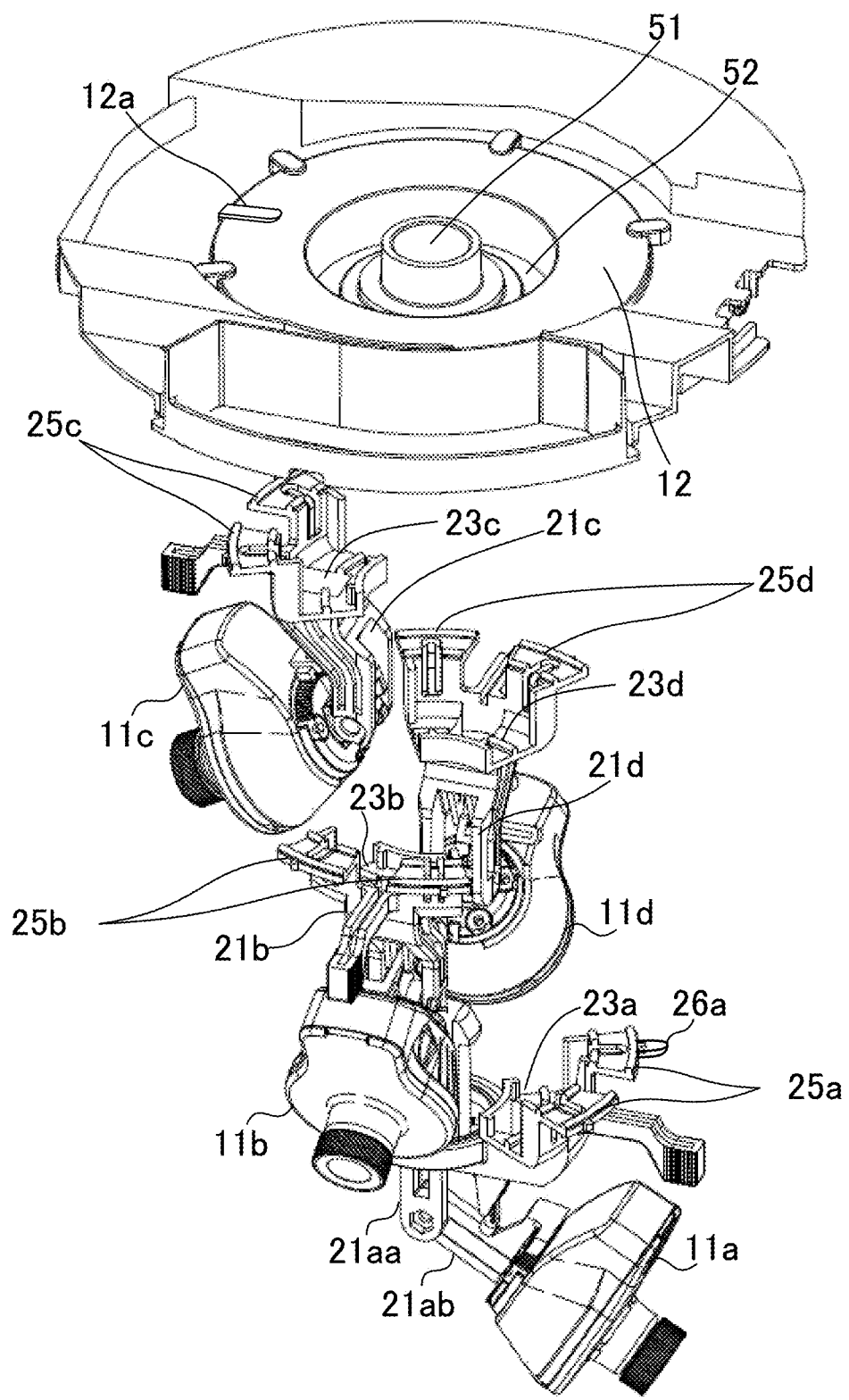
FIG. 13 is a view illustrating the connection of the connecting member to the base.

FIG. 13 is a view illustrating connection of connecting members 21aa and 21b to 21d to base 12. In FIG. 13, the same elements as FIG. 12 are assigned with the same reference signs. FIG. 13 is a perspective view of the surveillance camera seen from a housing 1 side. FIG. 13 also illustrates fitting portion 23b of connecting member 21b of which illustration is omitted in FIG. 12.

As illustrated in FIG. 13, flange 25a is formed on an end portion of fitting portion 23a of connecting member 21aa. Flange 25a comes into contact with the back surface of base 12 through concentric hole 52 formed in base 12. Connecting member 21aa does not fall in the direction of cover 2 since flange 25a is supported by the back surface of base 12.

Flange 25b is formed on an end portion of fitting portion 23b of connecting member 21b. Flange 25b comes into contact with the back surface of base 12 through concentric hole 52 formed in base 12. Connecting member 21b does not fall in the direction of cover 2 since flange 25b is supported by the back surface of base 12.

Flange 25c is formed on an end portion of fitting portion 23c of connecting member 21c. Flange 25c comes into contact with the back surface of base 12 through concentric hole 52 formed in base 12. Connecting member 21c does not fall in the direction of cover 2 since flange 25c is supported by the back surface of base 12.

Flange 25d is formed on an end portion of fitting portion 23d of connecting member 21d. Flange 25d comes into contact with the back surface of base 12 through concentric hole 52 formed in base 12. Connecting member 21d does not fall in the direction of cover 2 since flange 25d is supported by the back surface of base 12.

Flange 25a of connecting member 21aa has protrusion 26a. When moved to the position of protrusion 12a provided on the back surface of base 12 by the rotation of connecting member 21aa in the azimuth direction, protrusion 26a comes into contact with protrusion 12a. Accordingly, connecting member 21aa does not rotate 360 degrees or more in the azimuth direction. Other connecting members 21b to 21d also do not rotate 360 degrees or more by connecting member 21aa not rotating 360 degrees or more.

Wiring of cameras 11a to 11d is led to the inside of housing 1 through hole 51. Since connecting members 21aa and 21b to 21d do not rotate 360 degrees or more in the azimuth direction, excessive distortion of the wiring of cameras 11a to 11d is prevented. Any one of flanges 25b to 25d of connecting members 21b to 21d may have protrusion 26a.

Figure 14:
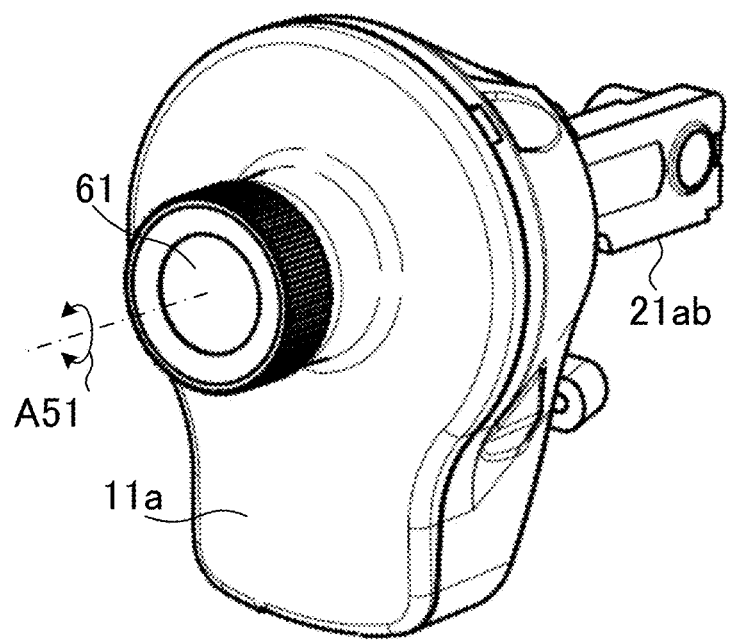
FIG. 14 is a perspective view of the camera seen from the front.

FIG. 14 is a perspective view of camera 11a seen from the front. FIG. 14 illustrates camera 11a and connecting member 21ab connected to camera 11a.

As illustrated in FIG. 14, camera 11a has lens 61 in the front thereof. Camera 11a rotates in the right-and-left direction with the imaging direction thereof as a rotation axis. For example, camera 11a rotates in the right-and-left direction with the imaging direction illustrated with a one-dot chain line as a rotation axis, as indicated with arrow A51 of FIG. 14.

Camera 11a rotates with respect to connecting member 21ab in the right-and-left direction with the imaging direction thereof as a rotation axis. Connecting member 21ab does not rotate in the right-and-left direction with the imaging direction thereof as a rotation axis.

Figure 15:
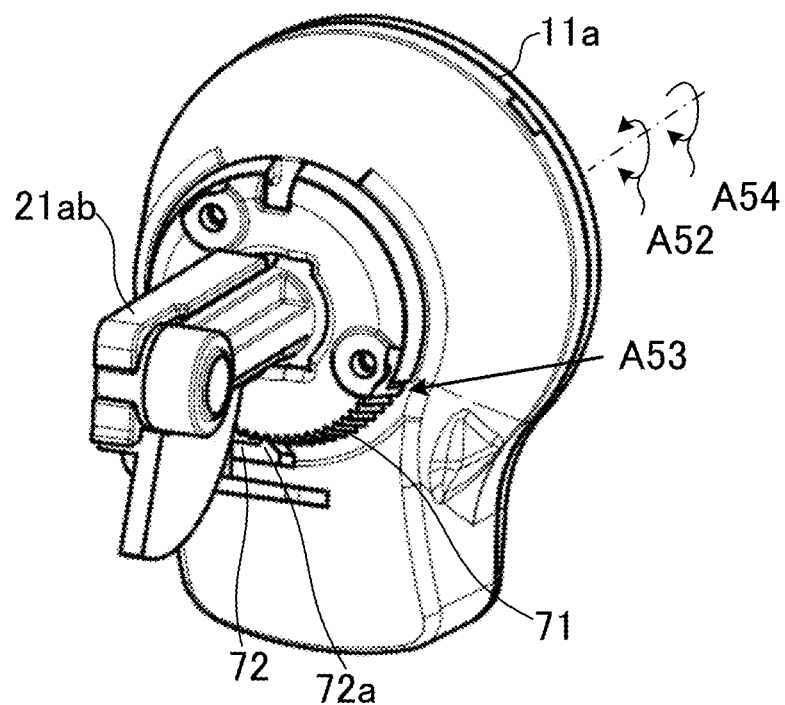
FIG. 15 is a perspective view of the camera seen from the back.

FIG. 15 is a perspective view of camera 11a seen from the back. In FIG. 15, the same elements as FIG. 14 are assigned with the same reference signs.

Camera 11a has gear teeth-shape engaging portion 71 on the back thereof. Engaging portion 71 is formed along the circumference of the camera.

Engaging portion 71 rotates with rotation of the camera with the imaging direction of camera 11a as a rotation axis. For example, when camera 11a rotates in a direction indicated with arrow A52 of FIG. 15, engaging portion 71 also rotates with the rotation of camera 11a.

Figure 16:
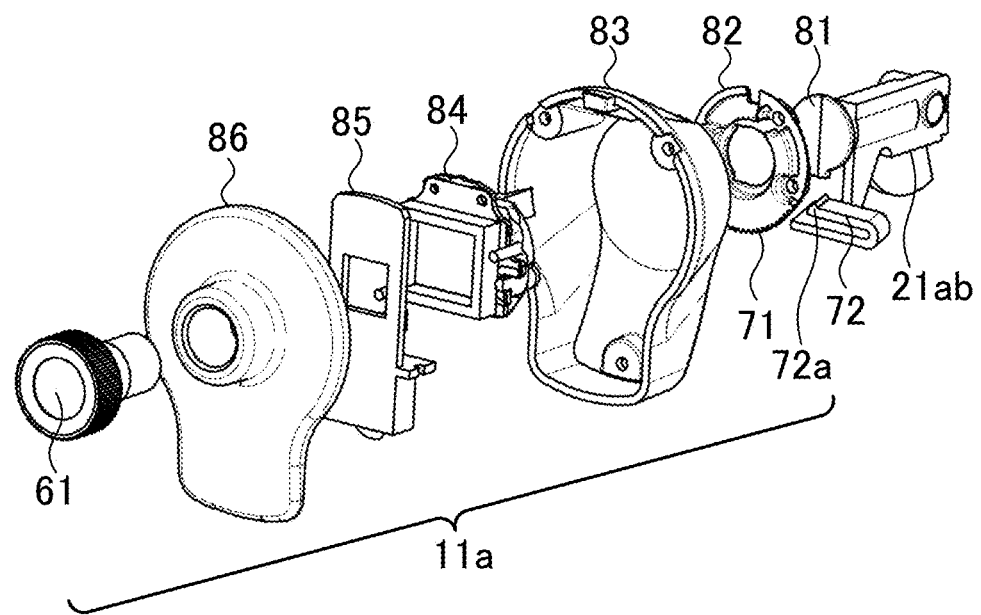
FIG. 16 is an exploded perspective view of the camera seen from the front.

Connecting member 21ab has lever 72 (also refer to FIG. 16). Claw 72a that engages with grooves of engaging portion 71 is provided on an end of lever 72. Lever 72 biases claw 72a in a groove direction of engaging portion 71.

Engaging portion 71 formed on the back of camera 11a rotates with respect to lever 72. By claw 72a of lever 72 being engaged with engaging portion 71, the rotation position of camera 11a is held (maintained) at a predetermined angle by which the camera is rotated by a user.

Camera 11a rotates within a range where engaging portion 71 engages with claw 72a of lever 72. For example, when a portion of engaging portion 71, which is indicated with arrow A53, comes to the position of claw 72a of lever 72, camera 11a does not rotate in the direction of arrow A54.

FIG. 16 is an exploded perspective view of camera 11a seen from the front. In FIG. 16, the same elements as FIGS. 14 and 15 are assigned with the same reference signs.

As illustrated in FIG. 16, connecting member 21ab has circular plate 81. Camera 11a has engaging member 82, covers 83 and 86, imaging element 84, and filter 85. Engaging portion 71 illustrated in FIG. 15 is formed on engaging member 82.

Circular plate 81 of connecting member 21ab has a diameter larger than an opening of engaging member 82. Circular plate 81 of connecting member 21ab passes through the opening of engaging member 82, and engaging member 82 through which circular plate 81 has passed is fixed to cover 83. Accordingly, cover 83 can rotate with respect to connecting member 21ab.

Covers 83 and 86 accommodate imaging element 84 and filter 85. Covers 83 and 86 each have a circular shape and have a shape in which a part thereof projects in a downward direction in FIG. 16. Substantially square imaging element 84 is accommodated in a circular portion of cover 83. Substantially rectangular filter 85 is accommodated in the circular portion and the portion projecting in the downward direction in FIG. 16 of cover 83.

Camera 11a can be miniaturized by covers 83 and 86 each having a shape illustrated in FIG. 16. For example, if the shapes of covers 83 and 86 are circles, the length of filter 85 in a longitudinal direction thereof should be the diameters of the covers. Consequently, the volumes of covers 83 and 86 increase. On the contrary, covers 83 and 86 illustrated in FIG. 16 each have the circular portion accommodating substantially square imaging element 84 and the projecting portion protruding from the circular portion and accommodating substantially rectangular filter 85, thereby achieving miniaturization.

Figure 17:
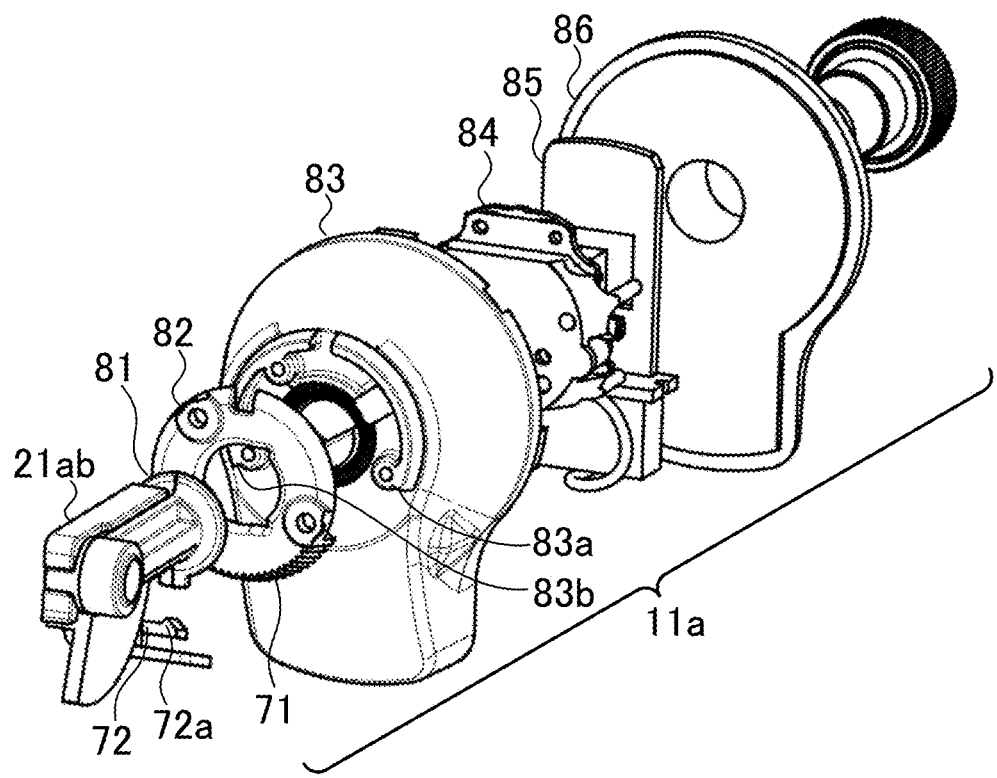
FIG. 17 is an exploded perspective view of the camera seen from the back.

FIG. 17 is an exploded perspective view of camera 11a seen from the back. In FIG. 17, the same elements as FIG. 16 are assigned with the same reference signs.

As illustrated in FIG. 16 as well, circular plate 81 of connecting member 21ab passes through the opening of engaging member 82. Engaging member 82 is fixed to the back of cover 83 in a state where circular plate 81 of connecting member 21ab has passed through the opening.

Accordingly, cover 83 rotates with respect to connecting member 21ab, and engaging member 82 fixed to the back of cover 83 also rotates with respect to connecting member 21ab. Then, engaging portion 71 formed on engaging member 82 rotates with respect to claw 72a of lever 72, and the rotation position of camera 11a is held (maintained) at a predetermined angle by claw 72a of lever 72 engaging with the grooves of engaging portion 71.

Cover 83 has stoppers 83a and 83b. Stoppers 83a and 83b regulate rotation of camera 11a. For example, when stoppers 83a and 83b come to the position of claw 72a of lever 72 by the rotation of cover 83, the stoppers come into contact with claw 72a of lever 72. By coming into contact with claw 72a of lever 72, stoppers 83a and 83b stop the rotation of cover 83 such that cover 83 does not rotate any further.

That is, camera 11a can rotate within a range where engaging portion 71 engages with claw 72a of lever 72. In other words, camera 11a rotates in the right-and-left direction by up to a predetermined angle with the imaging direction thereof as a rotation axis, and cannot rotate beyond the predetermined angle.

Figure 18A:
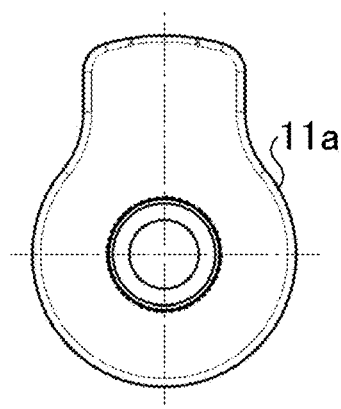
FIG. 18A is a view illustrating a rotation range of the camera.
Figure 18B:
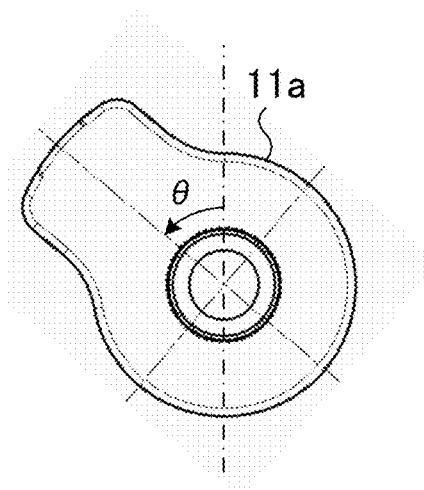
FIG. 18B is a view illustrating the rotation range of the camera.
Figure 18C:
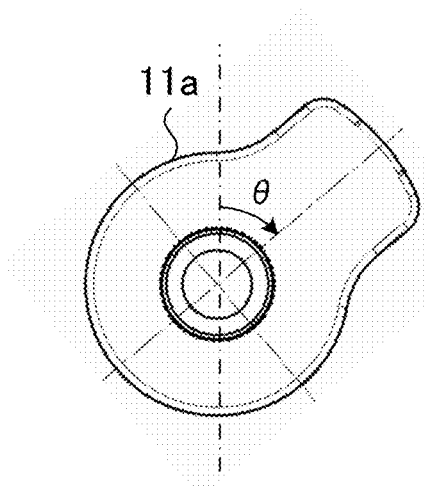
FIG. 18C is a view illustrating the rotation range of the camera.

FIGS. 18A, 18B, and 18C are views illustrating a rotation range of camera 11a. The surveillance camera is in a state where a top portion of cover 2 (not illustrated) faces a vertically downward direction. In this state, camera 11a is in a state where the portion projecting from the circular portion faces a vertically upward direction as illustrated in FIG. 18A. At this time, an up-and-down direction of landscape or the like imaged by camera 11a matches an up-and-down direction of an image displayed by a display device.

As illustrated in FIG. 18B, camera 11a can rotate counterclockwise of FIG. 18B by up to angle θ. In other words, a maximum rotation angle of camera 11a counterclockwise of FIG. 18B is θ.

As illustrated in FIG. 18C, camera 11a can rotate clockwise of FIG. 18C by up to angle θ. In other words, a maximum rotation angle of camera 11a clockwise of FIG. 18C is θ.

Cameras 11c to 11d have the same configuration as camera 11a illustrated in FIGS. 14, 15, 16, 17, 18A, 18B, and 18C. That is, also cameras 11c to 11d can each rotate in the right-and-left direction by up to a predetermined angle with the imaging direction thereof as a rotation axis, as in camera 11a. However, members of cameras 11c to 11d, which correspond to connecting member 21ab of camera 11a, have a smaller length than connecting member 21ab (for example, refer to a connection portion between camera 11c and connecting member 21c of FIG. 4).

The information processing device connected to the surveillance camera may invert an up-and-down direction of an image captured by the surveillance camera or may invert a right-and-left direction by means of, for example, software.

A wireless adapter is attached to or detached from connector CN1 illustrated in FIG. 3. A wireless communication function is added to the surveillance camera when the wireless adapter is attached to connector CN1.

Figure 19:
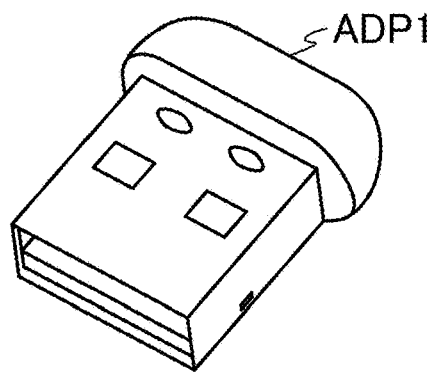
FIG. 19 is a perspective view of a wireless adapter.

FIG. 19 is a perspective view of wireless adapter ADP1. Wireless adapter ADP1 is, for example, a wireless adapter of Universal Serial Bus (USB). Wireless adapter ADP1 is an extension device for adding the wireless communication function to the surveillance camera. Wireless adapter ADP1 is attached to or detached from connector CN1 illustrated in FIG. 3.

When wireless adapter ADP1 is attached to connector CN1 of the surveillance camera, wireless adapter ADP1 performs, for example, short range wireless communication with a mobile terminal, such as a smartphone or a tablet terminal. Wireless adapter ADP1 may be, for example, a wireless Wi-Fi adapter that performs wireless communication in accordance with wireless Wi-Fi (Registered Trademark) technology. Alternatively, wireless adapter ADP1 may be, for example, a Bluetooth adapter that performs wireless communication in accordance with a wireless technology, such as Bluetooth (Registered Trademark).

Figure 20:
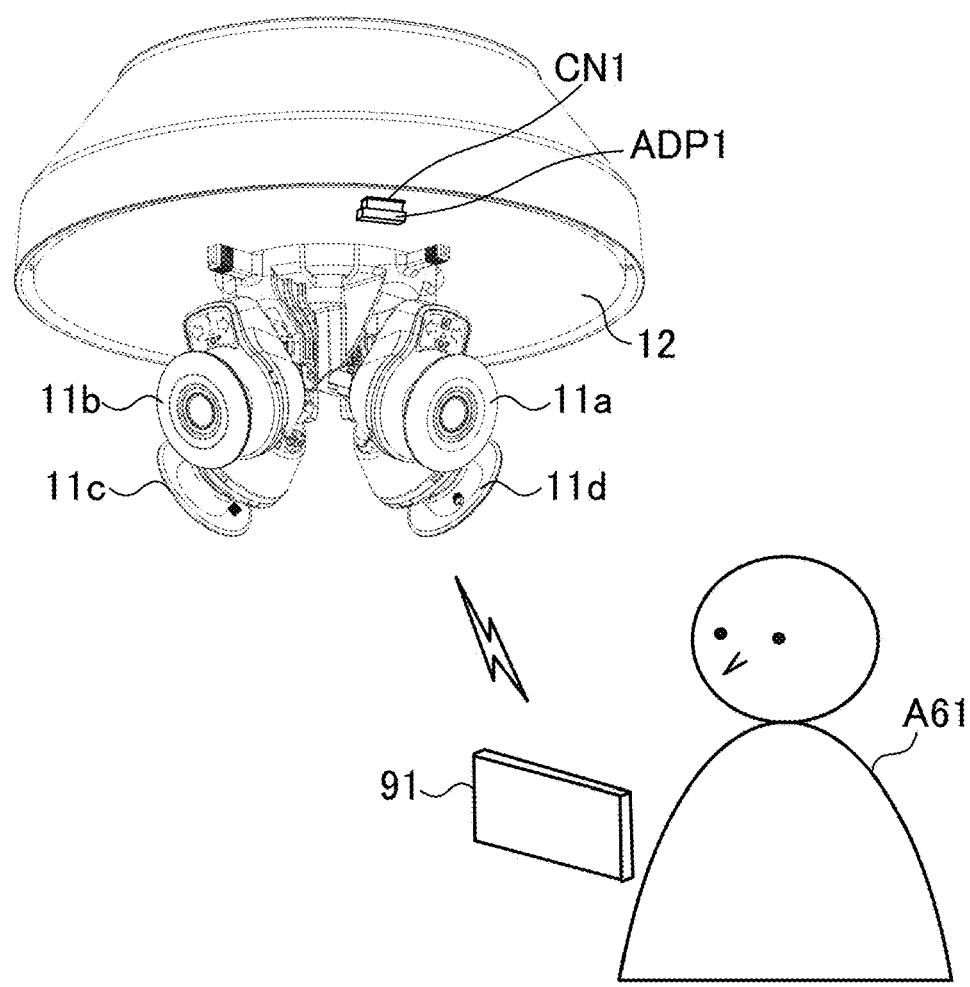
FIG. 20 is a view illustrating wireless communication between the surveillance camera and a mobile terminal.

FIG. 20 is a view illustrating wireless communication between the surveillance camera and mobile terminal 91. FIG. 20 illustrates a surveillance camera, user A61, and mobile terminal 91. In FIG. 20, the same elements as FIG. 3 are assigned with the same reference signs.

Wireless adapter ADP1 illustrated in FIG. 19 is inserted in connector CN1 of the surveillance camera. Accordingly, short range wireless communication becomes possible between the surveillance camera and mobile terminal 91.

Mobile terminal 91 is, for example, a smartphone or a tablet terminal each provided with a short range wireless communication function, such as Wi-Fi or Bluetooth. Mobile terminal 91 performs wireless communication with the surveillance camera having wireless adapter ADP1 attached thereto, and receives video data of an image captured by cameras 11a to 11d of the surveillance camera. Mobile terminal 91 displays an image of the received video data on a display.

User A61 is, for example, a contractor for installing the surveillance camera, or an agent for maintenance of the surveillance camera. User A61 can, for example, adjust the directions, focal points, brightness or the like of cameras 11a to 11d, while watching the image from cameras 11a to 11d displayed on the display of mobile terminal 91.

For example, for adjusting the directions, focal points, brightness or the like of cameras 11a to 11d of the surveillance camera, user A61 attaches wireless adapter ADP1 to connector CN1. The surveillance camera transmits the video data of an image captured by cameras 11a to 11d to mobile terminal 91 via wireless adapter ADP1. Mobile terminal 91 displays the image of the video data transmitted from the surveillance camera on a display. Accordingly, user A61 can adjust the directions, focal points, brightness or the like of cameras 11a to 11d while watching the image captured by cameras 11a to 11d and displayed on the display of mobile terminal 91, in the vicinity of the surveillance camera.

Upon completing the adjustment of cameras 11a to 11d, user A61 removes wireless adapter ADP1 from connector CN1. User A61 then mounts cover 2 on the surveillance camera. Accordingly, the video data from the surveillance camera cannot be output (transmitted) via wireless communication, thereby preventing illegal reception by a third party using the wireless communication. The surveillance camera can thus improve security.

Figure 21:
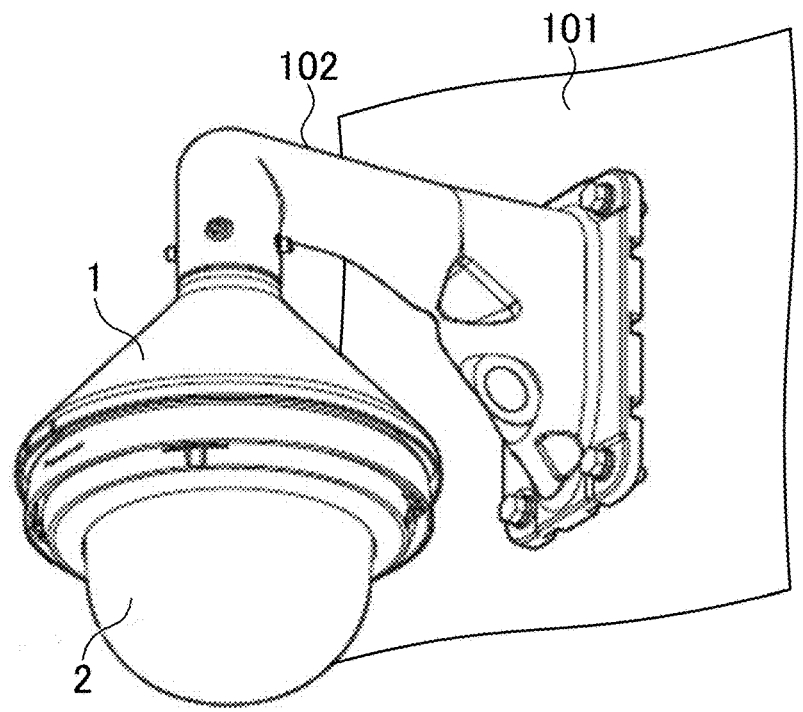
FIG. 21 is a view illustrating an installation example of the surveillance camera.

FIG. 21 is a view illustrating a disposition example of the surveillance camera. In FIG. 21, the same elements as FIG. 1 are assigned with the same reference signs. FIG. 21 illustrates a surveillance camera, as well as wall 101 and mounting arm 102.

Wall 101 is, for example, an outer wall or inner wall of a building. The surveillance camera is, for example, mounted (fixed) on wall 101 via L-shaped mounting arm 102 as illustrated in FIG. 21.

Figure 22:
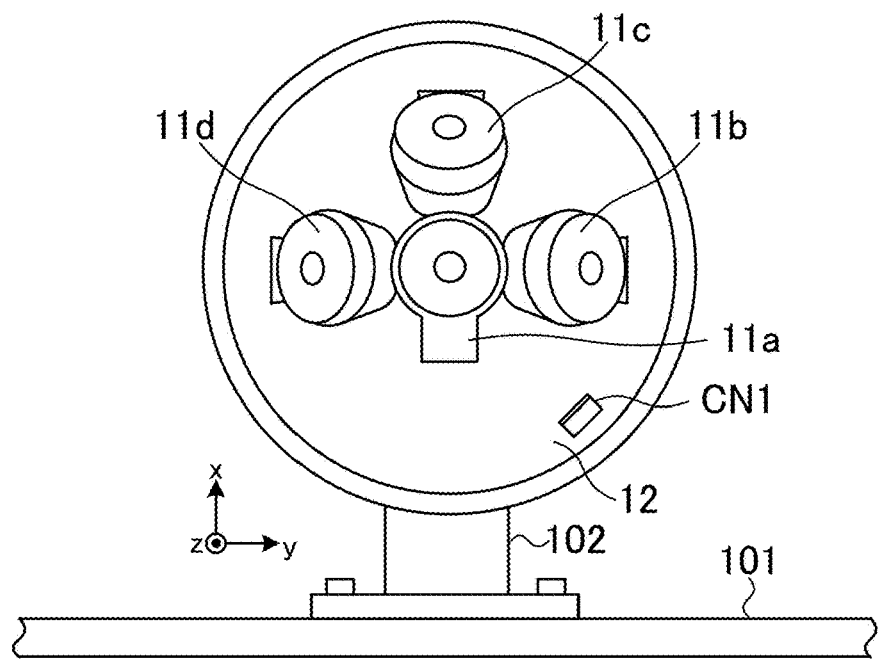
FIG. 22 is a view illustrating a disposition example of cameras in the surveillance camera provided on a wall.

FIG. 22 is a view illustrating a disposition example of cameras in the surveillance camera provided on wall 101. In FIG. 22, the same elements as FIG. 3 are assigned with the same reference signs. FIG. 22 simplifies the shape or the like of cameras 11a to 11d.

The surveillance camera provided on wall 101 can image places, for example, under the surveillance camera (+z axis direction), and in a front direction and a right-and-left direction of wall 101. In the above case, cameras 11a to 11d of the surveillance camera are disposed, for example, as illustrated in FIG. 22.

For example, camera 11a that can turn toward the top is moved to wall 101 side along rail 41 (refer to, for example, the rails in FIGS. 11 to 13). Further, camera 11a that can turn toward the top can be moved so that the imaging direction thereof turns downward.

Cameras 11b and 11d that cannot turn toward the top are moved so that the imaging directions thereof turn along the right-and-left direction (y axis direction) of wall 101. Camera 11c that cannot turn toward the top is moved so that the imaging direction thereof turns toward the front of wall 101 (+y axis direction).

Accordingly, the surveillance camera can image places under the surveillance camera, and in a front direction and a right-and-left direction of wall 101.

For imaging places in a front direction and a right-and-left direction of the wall as well as under the surveillance camera, it is preferred to move camera 11a that turns toward the top to wall 101 side along rail 41, as illustrated in FIG. 22. If camera 11a that turns toward the top is moved to the front side of wall 101 (moved to the position of camera 11c illustrated in FIG. 22) along rail 41, thereby turning the imaging direction of camera 11a downward (+z axis direction), one of remaining cameras 11b to 11d cannot be disposed at the position in the front side of wall 101 (the position of camera 11c illustrated in FIG. 22).

The surveillance camera having camera 11b to 11d disposed therein as illustrated in FIG. 22 can perform, for example, 270-degree imaging in a horizontal direction depending on the angles of view of cameras 11b and 11d. The disposition as illustrated in FIG. 22 may be referred to as, for example, "270-degree+under imaging disposition."

Figure 23:
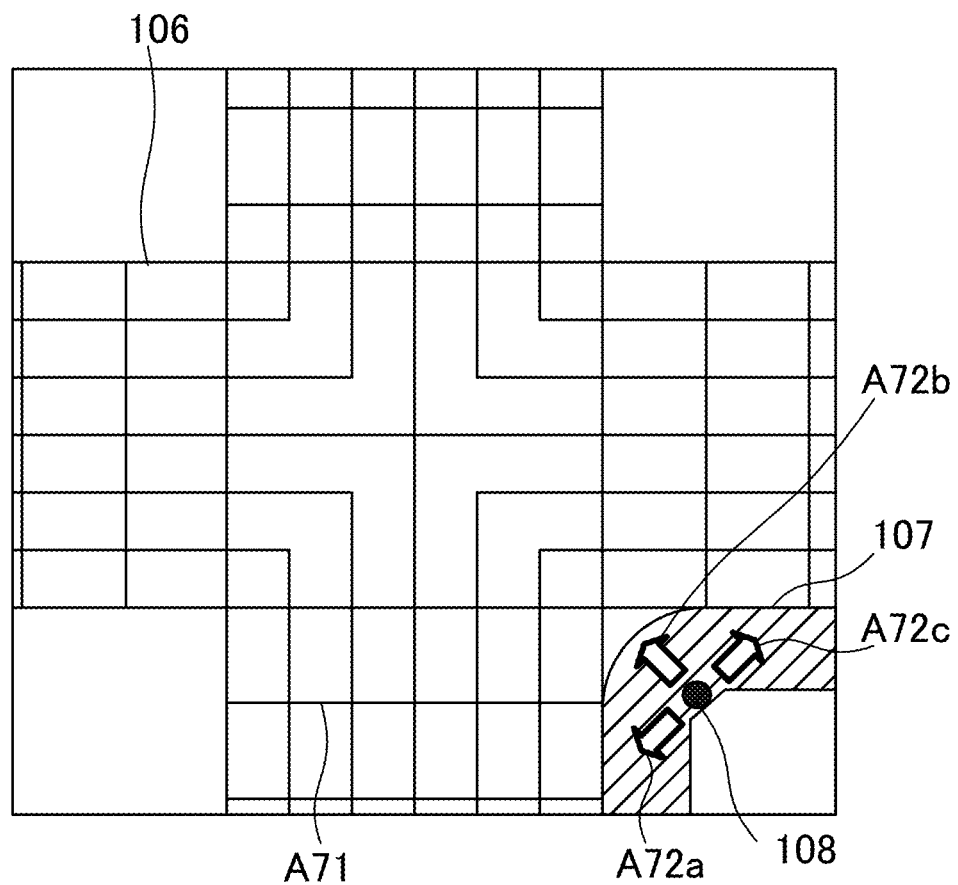
FIG. 23 is a view illustrating an example of an intersection where the surveillance camera is provided.

FIG. 23 is a view illustrating an example of intersection 106 where a surveillance camera is provided. FIG. 23 illustrates cross-shaped intersection 106. In FIG. 23, a part with hatching is sidewalk 107. The roads in intersection 106 are overlaid with lattice shaped lines A71 for expressing the perspective of an image captured by the surveillance camera.

In FIG. 23, black circle 108 refers to the position of the surveillance camera provided on an outer wall of a building. The surveillance camera is provided, for example, at the height of about 5 m from the ground for imaging intersection 106 and sidewalk 107.

Cameras 11a to 11d of the surveillance camera are disposed as illustrated in FIG. 22. Accordingly, the surveillance camera can image intersection 106 in front thereof and sidewalk 107 thereunder.

In FIG. 23, arrow A72a indicates the imaging direction of camera 11b in the surveillance camera illustrated in FIG. 22. Arrow A72b indicates the imaging direction of camera 11c in the surveillance camera illustrated in FIG. 22. Arrow A72c indicates the imaging direction of camera 11d in the surveillance camera illustrated in FIG. 22.

Figure 24:
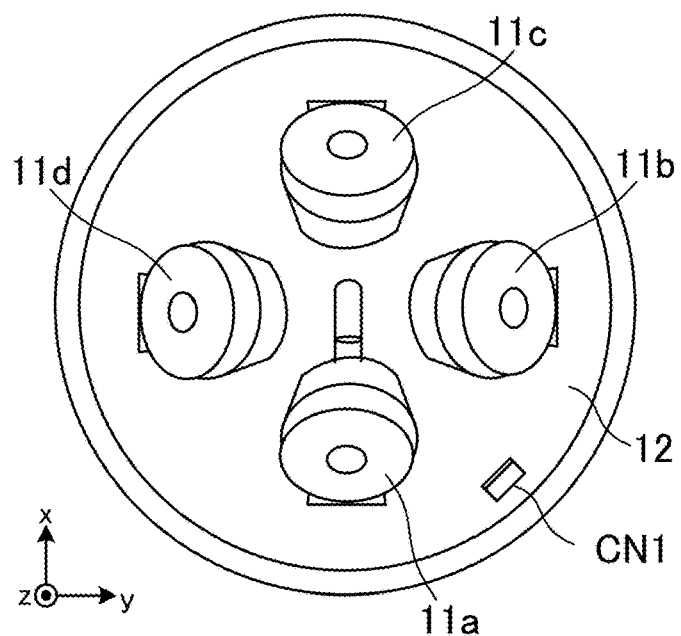
FIG. 24 is a view illustrating another disposition example of the cameras.

FIG. 24 is a view illustrating another disposition example of cameras 11a to 11d. In FIG. 24, the same elements as FIG. 3 are assigned with the same reference signs. FIG. 24 simplifies the shape or the like of cameras 11a to 11d.

The surveillance camera mounted on a ceiling of a building or the like can image places in a front direction, a rear direction and a right-and-left direction of the surveillance camera. In the above case, cameras 11a to 11d of the surveillance camera are disposed, for example, as illustrated in FIG. 24. The surveillance camera having camera 11a to 11d disposed therein as illustrated in FIG. 24 can perform 360-degree imaging in a horizontal direction. The disposition as illustrated in FIG. 24 may be referred to as, for example, "360-degree imaging disposition."

For providing the surveillance camera on wall 101 as illustrated in FIG. 21, the disposition of cameras 11a to 11d is preferably the "270-degree+under imaging disposition" described for FIG. 22. This is because if the disposition of cameras 11a to 11d is "360-degree imaging disposition" when the surveillance camera is provided on wall 101, one of cameras 11a to 11d will image wall 101.

On the other hand, when the surveillance camera is provided on a ceiling, the disposition of cameras 11a to 11d may be the "270-degree+under imaging disposition" or the "360-degree imaging disposition." The user who monitors images captured by the surveillance camera may select from the "270-degree+under imaging disposition" and the "360-degree imaging disposition" for cameras 11a to 11d in accordance with desired images.

Naturally, the disposition of cameras 11a to 11d is not limited to the "270-degree+under imaging disposition" or the "360-degree imaging disposition." The user who monitors images captured by the surveillance camera may freely dispose cameras 11a to 11d in accordance with desired images.

Figure 25A:
FIG. 25A is a view illustrating an example of a mobile terminal screen.

FIG. 25A is a view illustrating an example of a screen of mobile terminal 91. User A61 installs a surveillance camera on, for example, a building, a utility pole or the like. After the installation of the surveillance camera on a building, a utility pole or the like, user A61 attaches wireless adapter ADP1 to connector CN1 for adjusting cameras in the surveillance camera. When attached to connector CN1 of the surveillance camera, wireless adapter ADP1 broadcasts, for example, service set identifier (SSID).

User A61 operates mobile terminal 91 to display a list of access points on the display. The list of access points includes an access point name of wireless adapter ADP1 due to SSID broadcasting of wireless adapter ADP1.

Screen 111a in FIG. 25A is an example of a screen showing the list of access points on the display of mobile terminal 91. Screen 111a shows access points that can be accessed by mobile terminal 91. Access point 111a shown on screen 111a refers to an access point name of wireless adapter ADP1.

User A61 can access to wireless adapter ADP1 by, for example, tapping access point 111a and entering the password of wireless adapter ADP1.

When wireless communication between mobile terminal 91 and wireless adapter ADP1 becomes possible, for example, user A61 starts a browser of mobile terminal 91 and enters a Uniform Resource Locator (URL), an Internet Protocol (IP) address or the like of the surveillance camera to access to the surveillance camera. Accordingly, communication between mobile terminal 91 and the surveillance camera via wireless adapter ADP1 becomes possible.

The surveillance camera displays a setting screen of the surveillance camera in the browser of mobile terminal 91 in response to the access from mobile terminal 91. The surveillance camera may require a user ID and password before displaying the setting screen in the browser of mobile terminal 91.

Figure 25B:
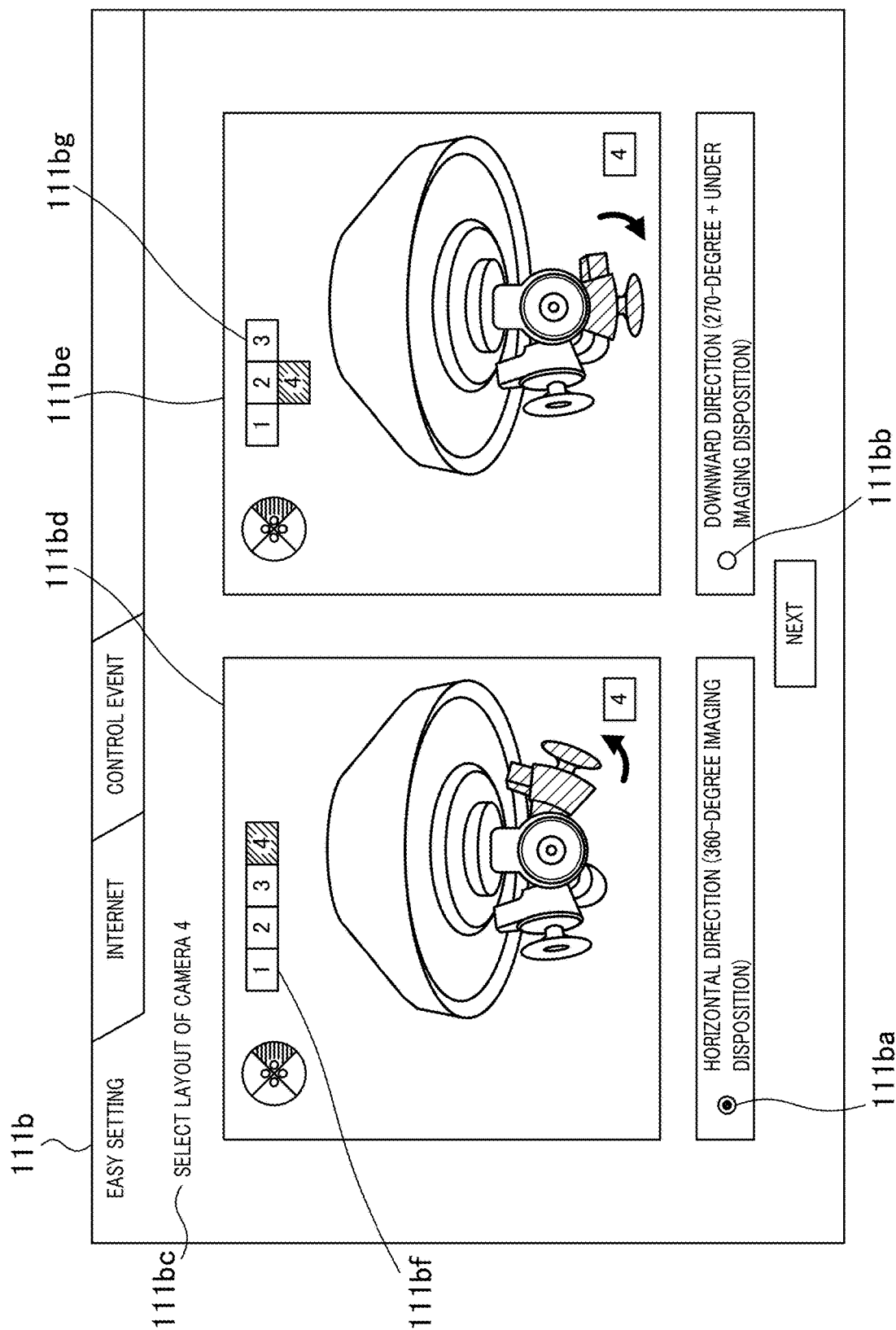
FIG. 25B is a view illustrating an example of the mobile terminal screen.

FIG. 25B is a view illustrating an example of the screen of mobile terminal 91. As described for FIG. 25A, when the surveillance camera is accessed from mobile terminal 91 via wireless adapter ADP1, the setting screen of the surveillance camera is displayed on the display of mobile terminal 91. Screen 111b illustrated in FIG. 25B is an example of the setting screen of the surveillance camera.

Radio buttons 111ba and 111bb are displayed on screen 111b. User A61 taps (selects) radio button 111ba or 111bb in accordance with the disposition of cameras 11a to 11d in the surveillance camera.

When user A61 installs the surveillance camera, for example, on a ceiling of a building and disposes cameras 11a to 11d in the "360-degree imaging disposition" illustrated in FIG. 24, user A61 taps radio button 111ba. Alternatively, when user A61 installs the surveillance camera, for example, on a wall of a building and disposes cameras 11a to 11d in the "270-degree+under imaging disposition" illustrated in FIG. 22, user A61 taps (selects) radio button 111bb.

"Camera 4" in text 111bc indicated on screen 111b corresponds to camera 11a. In addition, illustrations 111bd and 111be indicating the dispositions of cameras 11a to 11d are displayed on screen 111b. User A61 can tap radio button 111ba or 111bb while watching, for example, cameras 4 (cameras hatched with lines) in respective illustrations 111bd and 111be. For example, user A61 selects radio button 111bb when camera 4 is disposed as in illustration 111be (when cameras 11a to 11d are disposed in the "270-degree+under imaging disposition").

In addition, on screen 111b, displayed are illustrations 111bf and 111bg indicating how the image screens of cameras 11a to 11d are to be disposed on the display of mobile terminal 91. Illustration 111bf indicates that the image screens of cameras 11a to 11d are to be displayed laterally in a line. Illustration 111bg indicates that the image screens of cameras 11a to 11d are to be displayed in a T-shape.

User A61 taps radio button 111ba or 111bb, and then taps "next" button.

FIG. 25C is a view illustrating an example of the screen of mobile terminal 91. Screen 111c illustrated in FIG. 25C is displayed on the display of mobile terminal 91 when radio button 111bb illustrated in FIG. 25B is tapped and then "next" button is tapped.

Radio button 111bb illustrated in FIG. 25B is tapped when user A61 disposes cameras 11a to 11d in the "270-degree+under imaging disposition." When the disposition of cameras 11a to 11d is the "270-degree+under imaging disposition," camera 11a turns downward, and cameras 11b to 11d turn toward the front or the right or left direction (refer to, for example, FIG. 22). In the above case, the surveillance camera displays the image screens of cameras 11a to 11d on the display of mobile terminal 91 in a T-shape as illustrated on screen 111c. Accordingly, user A61 can easily understand the relation (connection) of the camera images of cameras 11a to 11d.

The image of "camera 1" illustrated on screen 111c is, for example, an image captured by camera 11b in FIG. 22. The image of "camera 2" is, for example, an image captured by camera 11c in FIG. 22. The image of "camera 3" is, for example, an image captured by camera 11d in FIG. 22. The image of "camera 4" is, for example, an image captured by camera 11a in FIG. 22. The plurality of camera images illustrated on screen 111c is an image example when a surveillance camera is disposed at the position of black circle 108 illustrated in FIG. 23 and images intersection 106.

When radio button 111b is selected, the surveillance camera displays the image of camera 11a with its up-and-down direction inverted on the display of mobile terminal 91. This is because when camera 11a is turned downward as illustrated in FIG. 22, an image captured by camera 11a becomes upside down. For example, an image sent from camera 11a is inverted compared to the image illustrated as "camera 4" in FIG. 25C. In other words, the up-and-down direction of an image from camera 11a is in an inverted relation compared to images from other cameras 11b to 11d.

When the up-and-down direction of an image from camera 11a is in the inverted relation compared to images from other cameras 11b to 11d, it is difficult for user A61 to adjust the images (adjust the cameras). The surveillance camera thus displays the image from camera 11a with its up-and-down direction inverted on the display of mobile terminal 91 as described above. Accordingly, user A61 can easily adjust cameras 11a to 11d.

Pull-down menu 111ca is displayed on screen 111c. User A61 can select one image to be solely displayed on the display of mobile terminal 91 from pull-down menu 111ca. Pull-down menu 111ca will be described below.

Figure 25D:
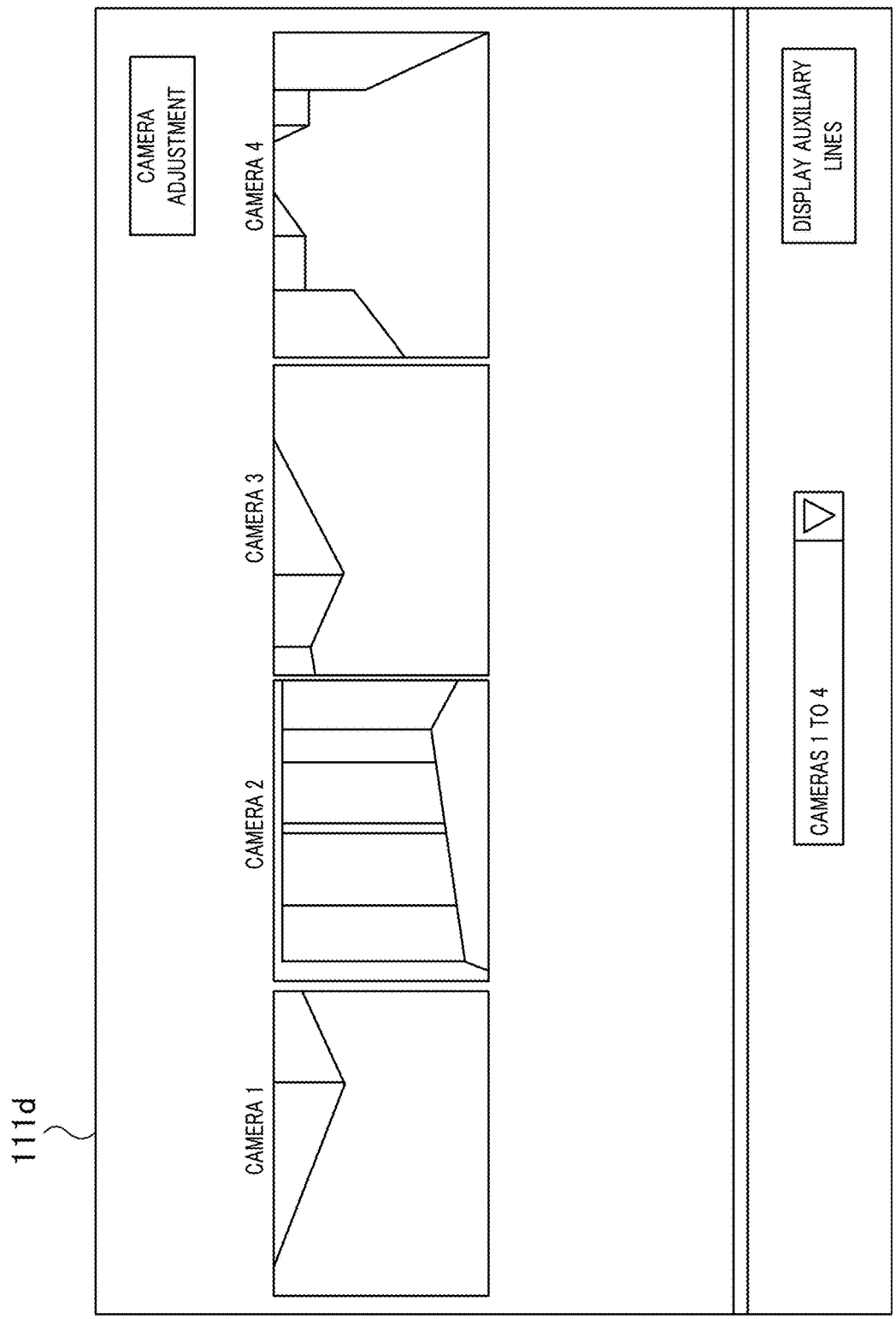
FIG. 25D is a view illustrating an example of the mobile terminal screen.

FIG. 25D is a view illustrating an example of the screen of mobile terminal 91. Screen 111d illustrated in FIG. 25D is displayed on the display of mobile terminal 91 when radio button 111ba illustrated in FIG. 25B is tapped and then "next" button is tapped.

Radio button 111*ba* illustrated in FIG. 25B is tapped when user A61 disposes cameras 11*a* to 11*d* in the "360-degree imaging disposition." When the disposition of cameras 11*a* to 11*d* is the "360-degree imaging disposition," cameras 11*a* to 11*d* turn toward the front, the rear, or the right or left direction (refer to, for example, FIG. 24). In the above case, the surveillance camera displays the image screens of cameras 11*a* to 11*d* disposed horizontally in a line on the display of mobile terminal 91 as illustrated on screen 111*d*. Accordingly, user A61 can easily understand the relation (connection) of the camera images of cameras 11*a* to 11*d*.

The image of "camera 1" illustrated on screen 111*d* is, for example, an image captured by camera 11*b* in FIG. 24. The image of "camera 2" is, for example, an image captured by camera 11*c* in FIG. 24. The image of "camera 3" is, for example, an image captured by camera 11*d* in FIG. 24. The image of "camera 4" is, for example, an image captured by camera 11*a* in FIG. 24. The plurality of images from cameras 11*a* to 11*d* illustrated on screen 111*d* is an image example when a surveillance camera is provided on, for example, a ceiling of a lobby of a building.

Figure 25E:
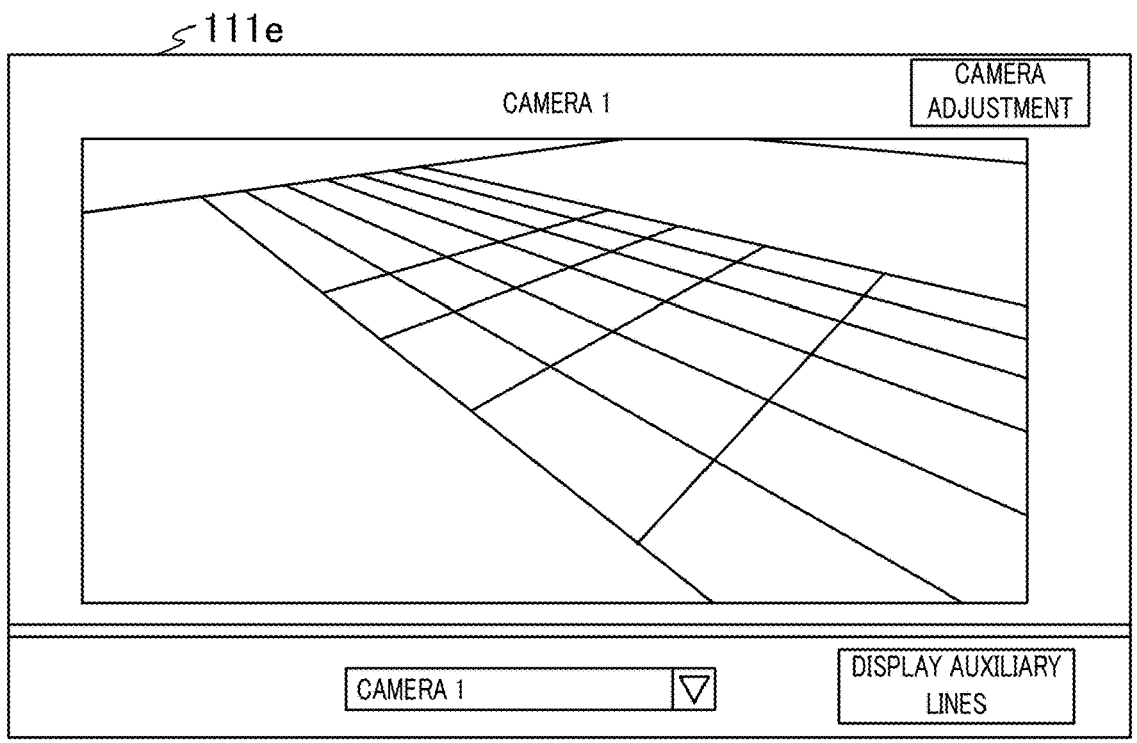
FIG. 25E is a view illustrating an example of the mobile terminal screen.

FIG. 25E is a view illustrating an example of the screen of mobile terminal 91. Screen 111*e* illustrated in FIG. 25E is displayed on the display of mobile terminal 91 when a camera is selected for displaying a desired image captured by the camera from pull-down menu illustrated in FIG. 25C.

For example, when pull-down menu 111*ca* illustrated in FIG. 25C is tapped, a menu (text) of "cameras 1 to 4," "camera 1," "camera 2," "camera 3" and "camera 4" is displayed. User A61 can select an image captured by one of cameras 11*a* to 11*d*, which is desired to be displayed on the display of mobile terminal 91, from pull-down menu 111*c*.

For example, when an image from camera 1 (camera 11*b*) is desired to be solely displayed on the display of mobile terminal 91, user A61 taps "camera 1" in pull-down menu 111*ca*. Screen 111*e* in FIG. 25E illustrates an example of a screen when "camera 1" in pull-down menu 111*ca* is tapped.

When one of "camera 1," "camera 2," "camera 3" and "camera 4" is selected from pull-down menu 111*ca*, the surveillance camera displays an image from the selected camera in a large size compared to the images of "cameras 1 to 4" in four-screen display. Accordingly, user A61 can easily adjust cameras 11*a* to 11*d* by selecting one of "camera 1," "camera 2," "camera 3" and "camera 4" from pull-down menu 111*ca*. Alternatively, user A61 can confirm, for example, the connection or the like between images of respective cameras 11*a* to 11*d* by selecting "cameras 1 to 4" from pull-down menu 111*ca*.

Switching the camera images from a pull-down menu illustrated in FIG. 25D can be performed in a similar manner as in pull-down menu 111*ca*. User A61 can select a camera from cameras 11*a* to 11*d* for displaying a desired image captured by the camera from the pull-down menu illustrated in FIG. 25D.

Switching the camera images from a pull-down menu illustrated in FIG. 25E can also be performed in a similar manner as in pull-down menu 111*ca*. User A61 can select a camera from cameras 11*a* to 11*d* for displaying a desired image captured by the camera, from the pull-down menu illustrated in FIG. 25E.

On screen 111*e* in FIG. 25E, "display auxiliary lines" button is displayed. When the "display auxiliary lines" button is tapped, the surveillance camera overlays with lattice shaped auxiliary lines the image from camera 1 (camera 11*b*) displayed on screen 111*e*.

Figure 25F:
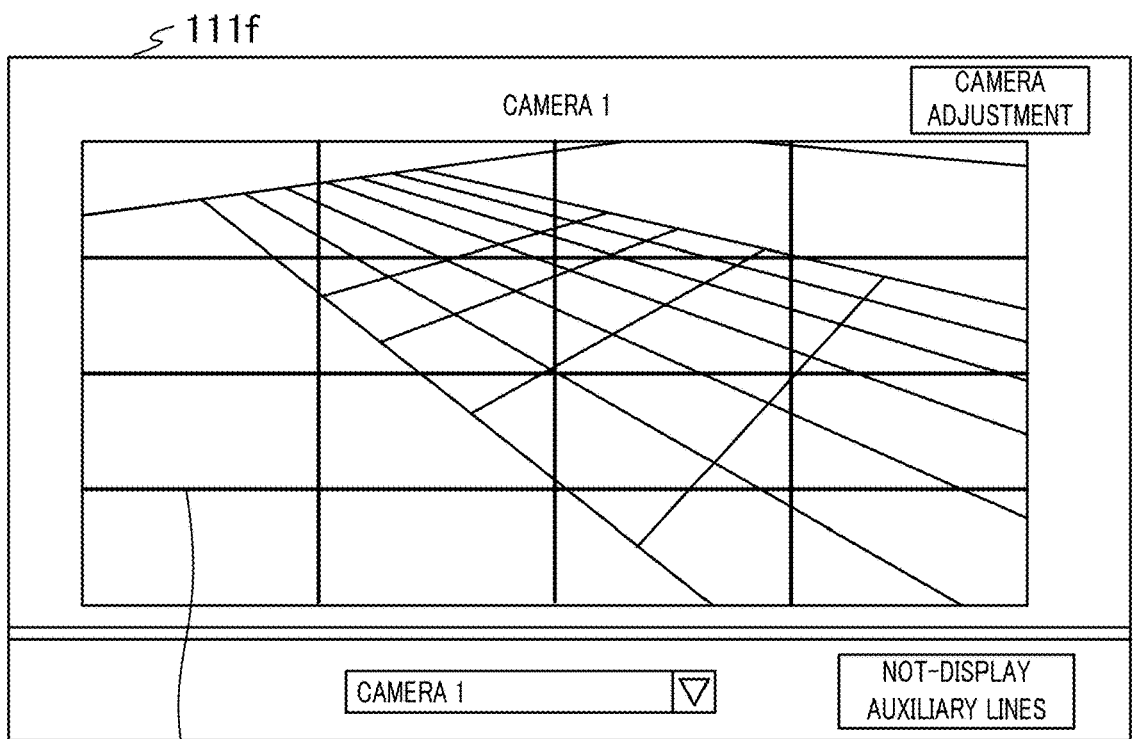
FIG. 25F is a view illustrating an example of the mobile terminal screen.

FIG. 25F is a view illustrating an example of the screen of mobile terminal 91.

Screen 111*f* illustrated in FIG. 25F is displayed on the display of mobile terminal 91 when the "display auxiliary lines" button in FIG. 25E is tapped. The image on screen 111*f* is an image captured by camera 1 (camera 11*b*).

The camera image on screen 111*f* is overlaid with lattice shaped auxiliary lines 111*fa*. User A61 can easily adjust cameras 11*a* to 11*d* due to the presence of lattice shaped auxiliary lines 111*fa* overlaying the camera image. For example, the adjustment of camera images in a horizontal direction or the like becomes easier for user 61A. More specifically, user 61A can more easily adjust cameras 11*a* to 11*d* about the imaging direction thereof as a rotation axis (adjustment in the θ direction in FIGS. 18A to 18C).

On screen 111*f* displaying auxiliary lines 111*fa*, "not-display auxiliary lines" button is displayed. When the "not-display auxiliary lines" button on screen 111*f* is tapped, the surveillance camera erases the auxiliary lines (when the "not-display auxiliary lines" button on screen 111*f* is tapped, screen 111*e* in FIG. 25E is displayed on the display of mobile terminal 91).

"Display auxiliary lines" button illustrated in FIG. 25C can determine whether to display or not to display auxiliary lines in a similar manner. "Display auxiliary lines" button illustrated in FIG. 25D can also determine whether to display or not to display auxiliary lines in a similar manner.

In addition, when "camera adjustment" button illustrated in FIGS. 25C to 25F is tapped, the surveillance camera changes the screen to an adjustment screen for adjusting focal points, brightness or the like of images displayed on mobile terminal 91 from cameras 11*a* to 11*d*. User A61 thus can adjust the focal points, brightness or the like of cameras 11*a* to 11*d* on the adjustment screen.

Further, user A61 can switch the to-be-displayed images captured by cameras 11*a* to 11*d* from line-shaped to T-shaped or vice versa on the adjustment screen. For example, the surveillance camera displays radio buttons 111*ba* and 111*bb* illustrated in FIG. 25B on the adjustment screen. User A61 can switch the to-be-displayed images captured by cameras 11*a* to 11*d* from line-shaped to T-shaped or vice versa by tapping radio button 111*ba* or 111*bb* displayed on the adjustment screen.

Figure 26:
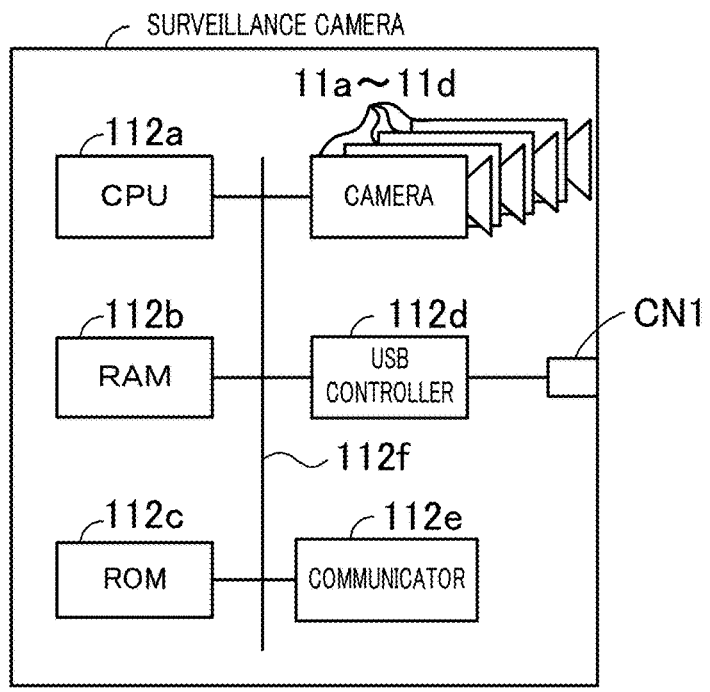
FIG. 26 is a view illustrating an example of hardware of the surveillance camera.

FIG. 26 is a view illustrating an example of hardware of the surveillance camera. As illustrated in FIG. 26, the surveillance camera has central processing unit (CPU) 112*a*, random access memory (RAM) 112*b*, read-only memory (ROM) 112*c*, USB controller 112*d*, communicator 112*e*, bus 112*f*, cameras 11*a* to 11*d* and connector CN1.

CPU 112*a* controls the whole surveillance camera. RAM 112*b*, ROM 112*c*, USB controller 112*d*, communicator 112*e* and cameras 11*a* to 11*d* are connected to CPU 112*a* via bus 112*f*.

Operating system (OS) programs and application programs which CPU 112*a* executes are temporarily stored in RAM 112*b*. Various data required for processes executed by CPU 112*a* is also temporarily stored in RAM 112*b*.

OS, application programs and the like are stored in ROM 112*c*.

USB controller 112*d* is connected to connector CN1. USB controller 112*d* supplies power to, for example, a device attached to connector CN1. USB controller 112*d* communicates with the device attached to connector CN1 in accordance with the instruction from CPU 112*a*.

Communicator 112*e* is connected to a network via cable 3, and communicates with an information processing device.

Figure 27:
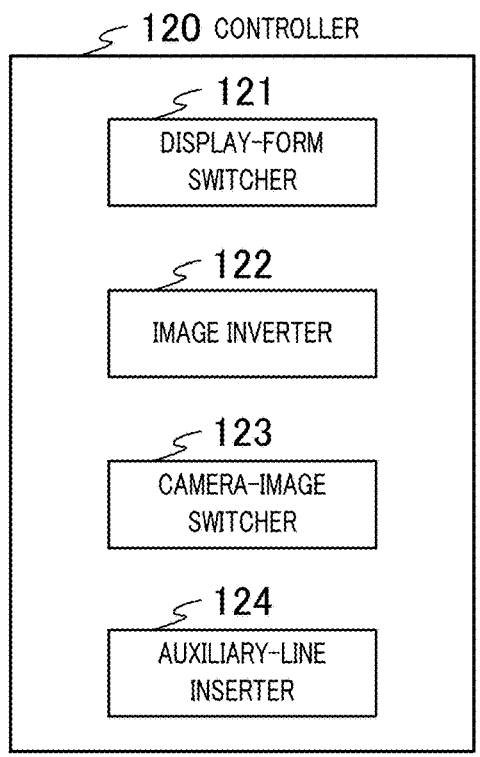
FIG. 27 is a view illustrating an example of a plurality of function blocks of the surveillance camera.

FIG. 27 is a view illustrating an example of a plurality of function blocks of the surveillance camera. CPU 112*a* functions as controller 120 by, for example, execution of programs. Controller 120 wirelessly transmits video data of images captured by cameras 11a to 11d to mobile terminal 91 by using wireless adapter ADP1 attached to connector CN1. The video data of images wirelessly transmitted to mobile terminal 91 is displayed on the display of mobile terminal 91. Controller 120 has display-form switcher 121, image inverter 122, camera-image switcher 123 and auxiliary-line inserter 124.

Display-form switcher 121 switches the display form of an image captured by cameras 11a to 11d and displayed on the display of mobile terminal 91.

For example, display-form switcher 121 places the images from cameras 11a to 11d to display them on the display of mobile terminal 91 in a line (refer to screen 111d in FIG. 25D) when received information indicating that radio button 111ba (refer to FIG. 25B) is tapped from mobile terminal 91. On the other hand, display-form switcher 121 places the images from cameras 11a to 11d to display them on the display of mobile terminal 91 in a T-shape (refer to screen 111c in FIG. 25C) when received information indicating that radio button 111bb (refer to FIG. 25B) is tapped from mobile terminal 91. In other words, display-form switcher 121 places the images from cameras 11b to 11d, which cannot turn toward the top, on the display of mobile terminal 91 horizontally in a line, and places the image from camera 11a, which can turn toward the top, on the display beneath and substantially in the middle of the images placed in the line.

When the images from cameras 11a to 11d are displayed in a T-shape on the display of mobile terminal 91, image inverter 122 displays the image from camera 11a, which can turn toward the top, with its up-and-down direction inverted on the display of mobile terminal 91.

Camera-image switcher 123 switches the images captured by cameras 11a to 11d and displayed on the display of mobile terminal 91 in response to the instruction from mobile terminal 91. For example, camera-image switcher 123 switches image(s) captured by cameras 11a to 11d and displayed on the display of mobile terminal 91 to camera image(s) selected from the pull-down menu displayed on screens 111c to 111f in FIGS. 25C to 25F.

Auxiliary-line inserter 124 displays lattice shaped auxiliary lines to overlay the image(s) from cameras 11a to 11d displayed on the display of mobile terminal 91 in response to the instruction from mobile terminal 91. For example, auxiliary-line inserter 124 displays lattice shaped auxiliary lines to overlay the camera image(s) displayed on mobile terminal 91 (refer to auxiliary lines 111fa in FIG. 25F) when received from mobile terminal 91 information indicating that "display auxiliary lines" button displayed on screens 111c to 111e in FIGS. 25C to 25E is tapped.

Figure 28:
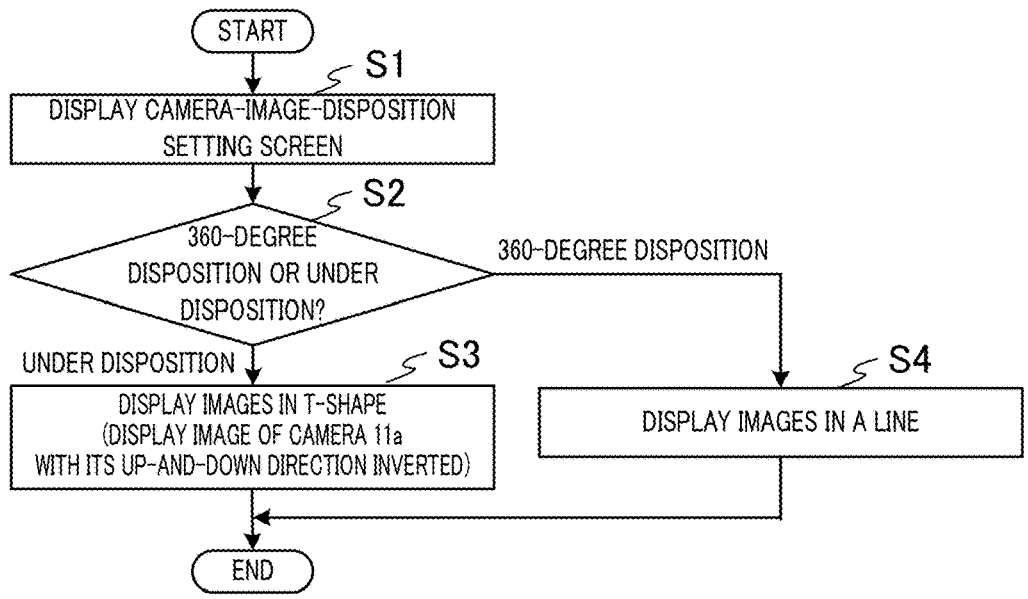
FIG. 28 is a flow chart illustrating an operation example of a controller.

FIG. 28 is a flow chart illustrating an operation example of controller 120. Controller 120 executes processes of the flow chart illustrated in FIG. 28 when, for example, wireless adapter ADP1 is attached to connector CN1, and accessed from mobile terminal 91.

Controller 120 displays a setting screen for setting the disposition of camera images on the display of mobile terminal 91 (Step S1). For example, controller 120 displays screen 111b illustrated in FIG. 25B on the display of mobile terminal 91.

Controller 120 determines whether "360-degree imaging disposition" is selected or "270-degree+under imaging disposition" is selected (Step S2). That is, controller 120 determines whether radio button 111ba illustrated in FIG. 25B is selected or radio button 111bb is selected.

When "270-degree+under imaging disposition" is selected ("under disposition" in S2), controller 120 displays images from cameras 11a to 11d in a T-shape (Step S3). For example, controller 120 displays the images from cameras 11a to 11d as illustrated on screen 111c in FIG. 25C. In addition, when displaying the images from cameras 11a to 11d in a T-shape, controller 120 inverts the up-and-down direction of the image from camera 11a capable of turning toward the top.

On the other hand, when "360-degree imaging disposition" is selected ("360-degree disposition" in S2), controller 120 displays the images from cameras 11a to 11d in a line (Step S4). For example, controller 120 displays the images from cameras 11a to 11d as illustrated on screen 111d in FIG. 25D. In addition, when displaying the images from cameras 11a to 11d in a line, controller 120 does not invert the up-and-down direction of the image from camera 11a capable of turning toward the top.

Figure 29:
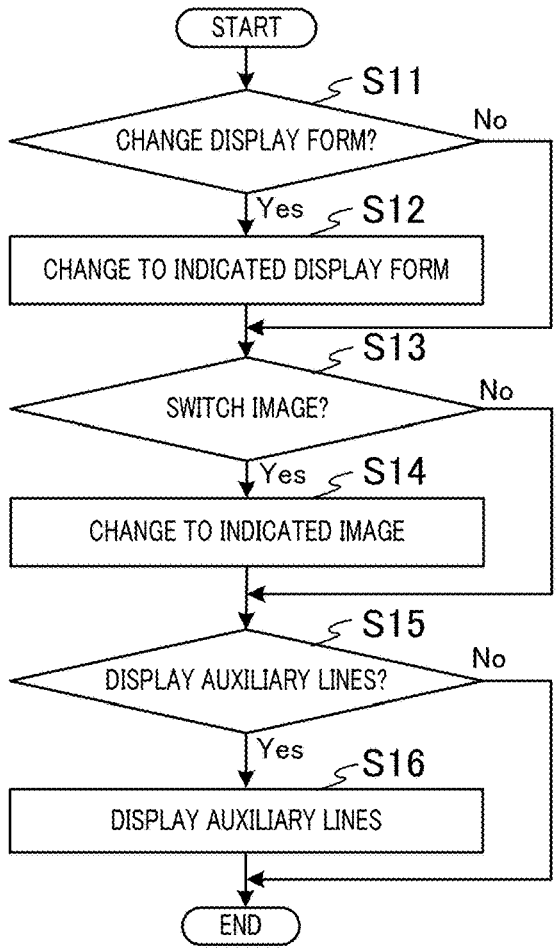
FIG. 29 is a flow chart illustrating an operation example of the controller.

FIG. 29 is a flow chart illustrating an operation example of controller 120. Controller 120, for example, repeatedly executes processes of the flow chart illustrated in FIG. 29 after the execution of the processes of the flow chart illustrated in FIG. 28.

Controller 120 determines whether or not an instruction is received from mobile terminal 91 for changing the display form of a camera image to be displayed on the display of mobile terminal 91 (Step S11). For example, controller 120 determines whether "camera adjustment" button illustrated on screens 111c to 111f in FIGS. 25C to 25F is tapped to send an instruction that tells controller 120 to change the display form from T-shaped to line-shaped. Alternatively, controller 120 determines whether "camera adjustment" button illustrated on screens 111c to 111f in FIGS. 25C to 25F is tapped to send an instruction that tells controller 120 to change the display form from line-shaped to T-shaped.

When a display-form changing instruction is received ("YES" in S11), controller 120 changes the display form in accordance to the changing instruction (Step S12). For example, controller 120 changes the T-shaped display form as illustrated on screen 111c in FIG. 25C to the line-shaped display form as illustrated on screen 111d in FIG. 25D. Alternatively, controller 120 changes the line-shaped display form as illustrated on screen 111d in FIG. 25D to the T-shaped display form as illustrated on screen 111c in FIG. 25C.

When it is determined that there is no display-form changing instruction in Step 11 ("NO" in S11), or when the display form is changed in Step S12, controller 20 determines whether or not an instruction is received from mobile terminal 91 for switching the camera image displayed on the display of mobile terminal 91 to another camera image. For example, controller 120 determines whether or not an image switching instruction is received from the pull-down menu illustrated on screens 111c to 111f in FIGS. 25C to 25F.

When the instruction for switching the camera image displayed on the display of mobile terminal 91 to another camera image is received from mobile terminal 91 ("YES" in S13), controller 120 switches the camera image to the indicated camera image (Step A14). Here is a case, for example, where controller 120 displays on the display of mobile terminal 91 images from cameras 1 to 4 (cameras 11a to 11d) as illustrated on screen 111c in FIG. 25C. When switching instruction that tells controller 120 to display the image from camera 1 (camera 11b) on the display of mobile terminal 91 is received from pull-down menu 111ca, controller 120 displays the image from camera 1 (camera 11b), as a magnified display, on the display of mobile terminal 91 as illustrated on screen 111e in FIG. 25E.

When it is determined that there is no image switching instruction in Step 13 ("NO" in S13), or when the display of a camera image is switched in Step S14, controller 120 determines whether or not an instruction regarding the display of auxiliary lines is received from mobile terminal 91 (Step S15). For example, controller 120 determines whether or not "display auxiliary lines" button illustrated on screens 111c to 111e in FIGS. 25C to 25E is tapped. Controller 120 also determines whether or not "not-display auxiliary lines" button to be displayed on screens 111c to 111e in FIGS. 25C to 25E (not illustrated in FIGS. 25C to 25E) is tapped.

When the instruction regarding the display of auxiliary lines is received from mobile terminal 91 ("YES" in Step S15), controller 120 displays auxiliary lines to overlay the image displayed on the display of mobile terminal 91 (Step S16). Alternatively, controller 120 erases the auxiliary lines overlaying the image displayed on the display of mobile terminal 91.

Controller 120, meanwhile, ends the processes of the flow chart when there is no instruction regarding the display of auxiliary lines ("NO" in S15) from mobile terminal 91.

As described above, the dome type surveillance camera includes cameras 11a to 11d, connector CN1 to which wireless adapter ADP1 is to be detachably attached, controller 120 which wirelessly transmits video data of images captured by cameras 11a to 11d to mobile terminal 91 by using wireless adapter ADP1 attached to connector CN1.

Accordingly, user A61 can easily adjust cameras 11a to 11d in the surveillance camera. For example, user A61 can adjust cameras 11a to 11d while watching an image captured by cameras 11a to 11d and displayed on the display of mobile terminal 91, in the vicinity of the surveillance camera.

Hereinabove, the surveillance camera places the image from camera 11a beneath the images from cameras 11b to 11d, which are placed in a line; however, the image from camera 11a may be placed above the line.

In addition, camera 11a is not necessarily movable to turn toward the top. That is, the display of camera images on the display of a mobile terminal using wireless adapter ADP1 as described above can be applied to a surveillance camera in which no camera can face the top of a cover.

Further, when only one of images from cameras 11a to 11d is displayed on the display of mobile terminal 91, the wireless communication load can be reduced compared to when four images from cameras 11a to 11d are displayed on the display of mobile terminal 91. Therefore, when only one of images from cameras 11a to 11d is displayed on the display of mobile terminal 91, the quality of the image may be increased compared to when four images from cameras 11a to 11d are displayed on the display of mobile terminal 91. Accordingly, for example, user A61 can adjust the camera while watching a clearer camera image by displaying only one of images from cameras 11a to 11d on the display of mobile terminal 91.

The surveillance camera may also be provided with a focus assist function. For example, cameras 11a to 11d in such a surveillance camera are each provided with a knob for adjusting the focal point. The surveillance camera displays on the display of mobile terminal 91, for example, an index value for indicating whether or not each of the focal points of cameras 11a to 11d is adjusted, when "camera adjustment" button is tapped, and then "focus assist" button is tapped. User A61 rotates the knob provided on each of cameras 11a to 11d so that the index value displayed on the display of mobile terminal 91 reaches the maximum value. Accordingly, user A61 can easily adjust the focus points.

Each function block used in the description for the above embodiment is typically realized as LSI, an integrated circuit. These may be fabricated as individual chips, or as one chip including some or all of the blocks. Herein, the integrated circuit is LSI, but may be referred to as an IC, a system LSI, a super LSI or an ultra LSI depending on a difference in the degree of integration.

A method of circuit integration is not limited to the LSI, and may be realized by using a dedicated circuit or a general purpose processor. A field-programmable gate array (FPGA) configured to be programmable after the production of LSI, or a reconfigurable processor capable of reconfiguration of connection or setting of circuit cells in the LSI may be utilized.

If future integrated circuit technology replaces LSIs as a result of the advancement of semiconductor technology or other derivative technology, the functional blocks could be integrated using the future integrated circuit technology. Biotechnology can also be applied.

INDUSTRIAL APPLICABILITY

The disclosure is advantageous for adjustment of cameras in a dome type surveillance camera.

REFERENCE SIGNS LIST

1 Housing
2 Cover
3 Cable
11a to 11d Camera
12 Base
12a, 24a, 26a Protrusion
21aa, 21ab, 21b, 21c, 21d Connecting member
22a, 22b, 22c, 22d Gripper
23a, 23b, 23c, 23d Fitting portion
25a, 25b, 25c, 25d Flange
31a, 31c, 31d Shaft member
41 Rail
51, 52 Hole
61 Lens
71 Engaging portion
72 Lever
72a Claw
81 Circular plate
82 Engaging member
83, 86 Cover
84 Imaging element
85 Filter
91 Mobile terminal
101 Wall
102 Mounting arm
111a to 111f Screen
120 Controller
121 Display-form switcher
122 Image inverter
123 Camera-image switcher
124 Auxiliary-line inserter
CN1 Connector
ADP1 Wireless adapter

The invention claimed is:

1. A surveillance camera that is a dome type surveillance camera, comprising:
   a plurality of cameras; and a controller which causes to display, on a display, video data of images captured by the plurality of cameras, wherein one camera of the plurality of cameras is movable so that an imaging direction of the one camera turns toward a top of a cover which covers the plurality of cameras, and the controller places, horizontally in a line, the images from some of the plurality of cameras, which do not turn toward the top, on the display, and places, substantially in a middle of and beneath or above the line, the image from the one camera which is movable so as to turn toward the top, wherein the controller switches a display form to a 360-degree imaging disposition ora 270-degree imaging disposition in response to an instruction from a mobile terminal.

2. The surveillance camera according to claim 1, wherein imaging directions of the plurality of cameras turn to a horizontal direction.

3. The surveillance camera according to claim 1, wherein the controller places the images from the plurality of cameras horizontally in a line on the display based on another instruction.

4. The surveillance camera according to claim 3, wherein:
the display is included in the mobile terminal; and
the controller wirelessly transmits the video data to the mobile terminal.

5. The surveillance camera according to claim 4, wherein the controller displays an auxiliary line on the display in response to an instruction from the mobile terminal.

6. A video placement method for images from a surveillance camera which is movable so that an imaging direction of one camera of a plurality of cameras turns toward a top of a cover which covers the plurality of cameras, the video placement method comprising:

placing, horizontally in a line on a display, the images from some of the plurality of cameras, which do not turn toward the top; and placing, substantially in a middle of and beneath or above the line, the image from the one camera, which is movable so as to turn toward the top, wherein a display form is switched to a 360-degree imaging disposition or a 270-degree imaging disposition in response to an instruction from a mobile terminal.

* * * * *